(12) United States Patent
Kamen et al.

(10) Patent No.: US 11,502,913 B1
(45) Date of Patent: Nov. 15, 2022

(54) SIMULATING TIME SYNCHRONIZATION

(71) Applicant: Equinix, Inc., Redwood City, CA (US)

(72) Inventors: Yakov Kamen, Los Altos, CA (US);
Yury Kamen, Foster City, CA (US);
Alex Wilms, Hayward, CA (US)

(73) Assignee: EQUINIX, INC., Redwood City, CA (US)

( * ) Notice: Subject to any disclaimer, the term of this patent is extended or adjusted under 35 U.S.C. 154(b) by 0 days.

(21) Appl. No.: 17/071,420

(22) Filed: Oct. 15, 2020

Related U.S. Application Data

(60) Provisional application No. 62/915,226, filed on Oct. 15, 2019.

(51) Int. Cl.
*H04L 41/14* (2022.01)
*H04J 3/06* (2006.01)

(52) U.S. Cl.
CPC .......... *H04L 41/145* (2013.01); *H04J 3/0635* (2013.01)

(58) Field of Classification Search
CPC .............................. H04L 41/145; H04J 3/0635
See application file for complete search history.

(56) References Cited

U.S. PATENT DOCUMENTS

| | | | |
|---|---|---|---|
| 3,416,812 A1 | 4/2013 | Radulescu | |
| 9,886,267 B2 | 2/2018 | Maheshwari et al. | |
| 9,948,552 B2 | 4/2018 | Teng et al. | |
| 2007/0147435 A1* | 6/2007 | Hamilton | H04L 43/16 370/503 |
| 2009/0249222 A1* | 10/2009 | Schmidt | H04L 51/32 715/751 |
| 2015/0178109 A1* | 6/2015 | Li | G06F 9/45558 718/1 |

OTHER PUBLICATIONS

U.S. Appl. No. 16/728,522, filed Dec. 27, 2019, naming inventors Kamen et al.
U.S. Appl. No. 16/728,562, filed Dec. 27, 2019, naming inventors Kamen et al.
Mehrpouyan et al., "A New Distributed Approach for Achieving Clock Synchronization in Heterogeneous Networks," IEEE Global Telecommunications Conference—GLOBECOM 2011, Dec. 5-9, 2011, pp. 2670-2674.
Zand et al., "Implementation of WirelessHART in the NS-2 Simulator and Validation of Its Correctness," Sensors: 14 (5), May 16, 2014, pp. 8633-8668.

(Continued)

*Primary Examiner* — Samina F Choudhry
(74) *Attorney, Agent, or Firm* — Shumaker & Sieffert, P.A.

(57) ABSTRACT

An example method includes creating, by a computing system and in response to user input, one or more virtual master devices and a plurality of virtual leaf devices in a virtual network system; selecting, by the computing system, data from one or more of real-time clock offset data, prerecorded clock offset data, or synthetically generated clock offset data; executing, by the computing system, a time synchronization simulation by applying a predefined clock offset generation algorithm to the selected data; and outputting, by the computing system, data indicative of results of the time synchronization simulation.

20 Claims, 13 Drawing Sheets

(56) References Cited

OTHER PUBLICATIONS

Xiong et al., "Randomized and Efficient Time Synchronization in Dynamic Wireless Sensor Networks: A Gossip-Consensus-Based Approach," Hindawi, Complexity: vol. 2018, Article IDS 4283087, Nov. 8, 2018, 16 pp.
Seyboth et al., "On robust synchronization of heterogeneous linear multi-agent systems with static couplings," Elsevier, Automatica: 53, Mar. 2015, pp. 392-399.
Gaderer et al., "A Novel Simulator for Clock Synchronized Distributed Systems," Elsevier: A Proceedings Volume from the 6th IFAC International Conference, Nov. 14-25, 2005, 7 pp.
"WAN Killer Network Traffic Generator," SolarWinds, Accessed Oct. 7, 2019 from: https://www.solarwinds.com/engineers-toolset/use-cases/traffic-generator-wan-killer, 4 pp.
"The Grinder, a Java Load Testing Framework," The Grinder, Accessed Oct. 7, 2019 from: http://grinder.sourceforge.net/, May 20, 2014, 2 pp.
"Network simulation and load testing," EXFO, Retrieved Oct. 4, 2019 from: https://www.exfo.com/en/products/lab-manufacturing-testing/network-simulation-load-testing/, 14 pp.

* cited by examiner

SIMULATING TIME SYNCHRONIZATION

This application claims the benefit of U.S. Provisional Application No. 62/915,226, filed Oct. 15, 2019, the entire content of which is incorporated by reference herein.

TECHNICAL FIELD

The disclosure relates to time synchronization in computer networks.

BACKGROUND

A synchronization system, in general, synchronizes clocks of multiple computing devices based on the clock of a chosen master device (also referred to as a "primary" device or a "leader" device). The master device is a computing device that gets time synchronization data from other master devices or intelligent engines deployed either inside or outside of the synchronization system, such as a global positioning system (GPS). The typical synchronization system has one or more layers of master devices with other end devices (also referred to as "replica" devices or "follower" devices) connected to at least one master device. Master devices are connected to the more precise sources of timestamps. In some implementations, master devices may belong to a service provider and can be designed to support precise time processing, while end devices may belong to the service client and receive timestamp offsets from master devices. These master and end devices can be chosen arbitrarily or assigned by the network.

In many applications, including but not limited to financial, scientific, military, programmatic advertising, and gaming industries, time synchronization may be beneficial. For instance, such knowledge would be used to define trade orders in high-frequency trading systems and gamers' responses in multi-user games.

SUMMARY

In general, the disclosure describes techniques, systems, and devices to provide computing device clock synchronization in heterogeneous distributed computer networks based on characteristics of computing devices in the computer networks. In particular, the disclosure describes a timing synchronization system simulator. The techniques of this disclosure allow a user to customize a highly realistic simulator of complex and distributed heterogeneous time synchronization system using real and synthetically generated timestamp data. The disclosure describes a system that allows for setup, modifying, and adjusting a simulation system, and to test and visualize different offset computation algorithms based on synthetic timestamp data and real timestamp data collected in a simulator knowledgebase.

The techniques of this disclosure relate to the development of an intelligent simulation system which allows the building of complex time synchronization systems by testing new offset generation algorithms and assessing the influence of factors such as network load and temperature on precision and accuracy of synchronization. The techniques of this disclosure allow the simulation of clock offset computation and synchronization system operation in heterogeneous distributed network systems. The simulator allows a user to set up a virtual time synchronization network, define simulation timestamp sequences, install and test offset generation algorithm, and establish and provide results, e.g., visually and with reports.

In some example, a Synchronization System uses using real-time timestamp data and real clock offset data produced by real Master Devices and delivered to real leaf Devices. Real master and leaf devices refers to actual deployed devices that exist in physical or distributed virtualized form and are deployed in a network to process actual network traffic. With a Simulation System ("Simulator"), a user can describe and create virtual Master and leaf Devices and use any one or more of the following as inputs: data real-time information, pre-recorded information, or synthetically generated information. Virtual master and leaf devices may include models of network devices used for simulations, that do not process actual network traffic. The Simulation System may allow, e.g., the testing of different network configurations, testing of third-party or internally-developed offset generation algorithms, and the application of different network loads. Results of the simulation can be promptly visualized and stored in the knowledgebase for future use. Using the Simulation System may significantly speed up the development of the Synchronization System, and allows for creating and testing new synchronization algorithms and improve the Synchronization System's efficiency and scalability.

In one example, a method includes creating, by a computing system and in response to user input, one or more virtual master devices and a plurality of virtual leaf devices in a virtual network system; selecting, by the computing system, data from one or more of real-time clock offset data, prerecorded clock offset data, or synthetically generated clock offset data; executing, by the computing system, a time synchronization simulation by applying a predefined clock offset generation algorithm to the selected data; and outputting, by the computing system, data indicative of results of the time synchronization simulation.

In another example, a method includes defining an environment of a plurality of devices, each device having certain selected characteristics; populating a data set with time synchronization information; executing a simulation process based on the defined environment and data set to generate output data; and outputting the output data for display.

In a further example, a computing system includes a memory; and processing circuitry configured to: create, in response to user input, one or more virtual master devices and a plurality of virtual leaf devices in a virtual network system; select data from one or more of real-time clock offset data, prerecorded clock offset data, or synthetically generated clock offset data; execute a time synchronization simulation by applying a predefined clock offset generation algorithm to the selected data; and output data indicative of results of the time synchronization simulation.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Like reference characters refer to like elements throughout the figures and text.

DETAILED DESCRIPTION

Figure 1:
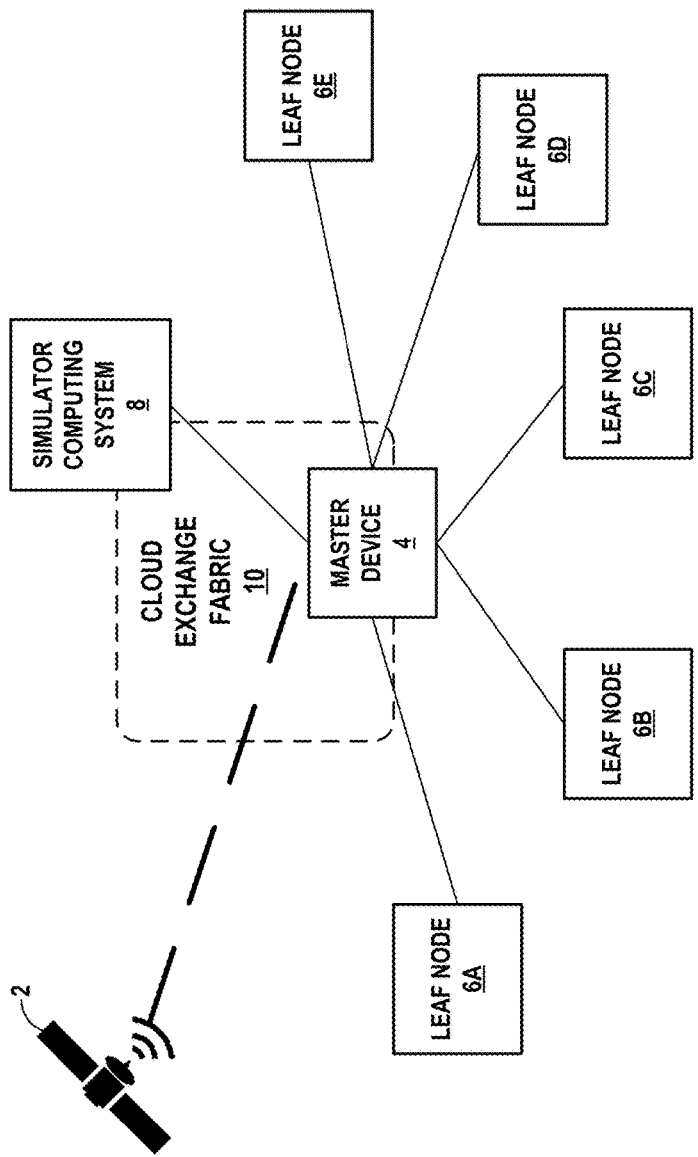
FIG. 1 is a conceptual diagram of an example time synchronization system with a global positioning system (GPS) device, a master device, and multiple leaf nodes, in accordance one or more techniques of the current disclosure.

In general, the disclosure describes techniques, systems, and devices to provide computing device clock synchronization in heterogeneous distributed computer networks based on characteristics of computing devices in the computer networks. In particular, the disclosure describes a timing synchronization system simulator. The techniques of this disclosure allow a user to customize a highly realistic simulator of complex and distributed heterogeneous time synchronization system using real and synthetically generated timestamp data. The disclosure describes a system that allows to setup, modify, and adjust a simulation system, and to test and visualize different offset computation algorithms based on synthetic timestamp data and real timestamp data collected in a simulator knowledgebase.

The techniques of this disclosure allow for pre-defining and building a customized time synchronization system having parameters that are selected such that the system performs relatively efficiently and accurately. The disclosure describes a simulation system that allows for testing time synchronization system's behavior before worldwide deployment of the system. This may allow for testing system parameters and time synchronization algorithms and troubleshooting the system prior to deploying.

Computing devices in a heterogeneous distributed cluster are typically equipped with hardware oscillator assisted computer clocks. These computer clocks ("clocks") estimate real time (which may be represented in equations with the variable 't') with a certain level of accuracy. At any moment of time, the clock time approximation is defined as a function $C(t)$. The value of $C(t_0)$ at any fixed moment in time $t_0$ is called the timestamp. The difference between $C(t)$ and t is called time estimation error $(Err(C)=t-C(t))$. Due to temperature changes and resonator aging, all clocks are subject to drifts and jitters. Without special clock time correction procedures, the error of time Err(C) estimation will generally increase as time goes on.

One example method of time correction is the use of a device which generates more precise timestamps and synchronizing the time on other devices to this more precise device. This more precise device is called the "Master Device." A device that requires timestamp adjustments is called the end device (also referred to as "leaf" devices or "client" device). The synchronization process generally estimates a time difference between master and leaf device clocks by analyzing previous measurements as well as the physical state of the devices and connections between them. The difference between a master device timestamp and an end device timestamp is called the timestamp offset. The process of end device clock timestamp correction using the timestamp offset is called "clock synchronization" or "timestamp synchronization."

The following is an example of a typical clock synchronization process. At the moment $t_0$, end device timestamp estimation $C(t_0)$ has been corrected by timestamp offset $O(t_0)$ as $C_n(t_0)=C(t_0)+O(t_0)$. The clock error in the end device starts to grow immediately after the timestamp to until the new correction will at the timestamp $t_1$. $Err(x)$ is a function that defines the error that a clock accrues after the last synchronization (in this example, timestamp $t_0$). An approximation of $Err(x)$ may be approximated as follows:

$$Err(t,t_0)=t+R(t-t_0)+D(t-t_0)+s(t), \quad (1)$$

where t is the current time, to is the time at the previous synchronization, R is a frequency offset (clock wander (jitter) due to temperature change), D is the drift due to resonator aging, and s is the stochastic error term.

Systems may accurately estimate $R(.)$ and $D(.)$ in equation (1) as linear or non-linear functions of t and $t_0$. In a case of linear function equation (1) can be re-written as:

$$Err(t,t_0)=a(t_0)*t+b(t_0), \quad (2)$$

where $t_0$ is the time of the previous synchronization, $a(t_0)$ is a clock drift gradient at the time interval $[t_0,t]$, and $b(t_0)$ is an offset at the time interval $[t_0,t]$. If the time interval $[t_0,t]$ is small enough, the gradient $a(t_0)$ is very small and the linear function at the interval $[t_0,t]$ can be approximated by the constant function:

$$Err(t,t_0)=b(t_0). \quad (3)$$

If offset $O(t)$ can accurately estimate the Err function, it would allow the overall system to increase the precision of the end device clock. In other words, if $C_o(t)=C(t)+O(t)$, at time $t_1$ the system would create timestamp $C_o(t_1)$ for an error $Err(t_1)=C_o(t_1)-t_1$. The synchronization improves clock precision if $C_o(t_1)-t_1 < C(t_1)-t_1$, i.e. offset decreases the error of the clock. The main problem for time synchronization is the estimation of the offset $O(t)$.

In one example, the clock synchronization process includes the use of GPS modules that provide precise time signals from satellites, distribution modules (switches) that allow the transfer of a time signal from the GPS module to time management modules, cluster node connection and distribution modules, cluster nodes, and a connection intelligent engine that defines the most effective connection mechanism between the GPS module and cluster nodes.

In another example, the clock synchronization apparatus described herein includes GPS modules that provide precise time signals from satellites, distribution modules (switches) that allow the transfer of a time signal from the GPS module to time management modules, cluster node connection and distribution modules, cluster nodes, a connection intelligent engine that defines the most effective connection mechanism between the GPS module and cluster nodes, and an intelligent synchronization filter module that eliminates potential outliers in the time synchronization process.

In another example, the clock synchronization apparatus described herein includes GPS modules that provide precise time signals from satellites, distribution modules (switches) that allow the transfer of a time signal from the GPS module to time management modules, cluster node connection and distribution modules, cluster nodes, a connection intelligent engine that defines the most effective connection mechanism between the GPS module and cluster nodes, an intelligent synchronization filter module that eliminates potential outliers in the time synchronization process, and a load control engine that changes the time synchronization algorithms based on network load.

Certain arrangements of networks include multiple clusters (also referred to herein as "cluster nodes," "device cluster nodes," or "device clusters"), or sets of devices within geographical proximity to one another. Devices from the same cluster node are typically located in a local-area network (LAN) and have faster access times and lower network loads than cross-cluster devices, so clusters typically act separately from one another.

For the purposes of this disclosure, a synchronization system or a system indicates a complex set of devices, algorithms, programs, modules, and components which allow the execution of time synchronization operations.

For the purposes of this disclosure, a device clock indicates an internal clock of the device. A device can have a single device clock or more than one device clock, including one or more of a Network Interface Card (NIC) card clock, a Graphics Processing Unit (GPU) clock, a central processing unit (CPU) clock, or an operation system clock.

For the purposes of this disclosure, a Time Synchronization Simulation System or Simulation System or Simulator refers to a complex set of one or more computing devices, algorithms, programs, modules, and components which allow the simulation of time synchronization processes.

For the purposes of this disclosure, a system clock indicates a clock associated with the synchronization system. The system clock may be a high precision clock which provides a precise time signal and generates precise timestamps, such as a clock on a GPS. The synchronization system may have more than one system clock.

For the purposes of this disclosure, a timestamp indicates an individual time signal measurement registered by a time measurement device. For the purposes of this disclosure, a device timestamp indicates a timestamp generated by a device. For the purposes of this disclosure, a system timestamp indicates a timestamp computed by the synchronization system. For the purposes of this disclosure, a timestamp offset (also referred to herein as a "time synchronization offsets" and an "offset") indicates a difference between two timestamps. For instance, the timestamp offset may be calculated as a difference between the device timestamp and the system timestamp.

For the purposes of this disclosure, the network time protocol (NTP) is a networking protocol for clock synchronization between computer systems over packet-switched, variable-latency data networks. For the purposes of this disclosure, the precision time protocol (PTP) is a protocol used to synchronize clocks throughout a computer network.

For the purposes of this disclosure, a switch indicates a computer networking device that connects devices together on a computer network by using packet switching to receive, process, and forward data to the destination device. For the purposes of this disclosure, a PTP switch indicates a switch that supports the PTP standard protocol and allows the receipt, processing, and forwarding of timestamps to the destination devices. For the purposes of this disclosure, an NTP Switch indicates a switch that supports the NTP standard protocol and allows the receipt, processing, and forwarding of timestamps to the destination devices. For the purposes of this disclosure, a master switch indicates a special device that allows the receipt, processing and forwarding of time signal from a GPS antenna.

For the purposes of this disclosure, a system state indicates a set of parameters that allows the estimation of how loaded and "ready for time synchronization" a system is. For the purposes of this disclosure, a device cluster node (also referred to herein as a "device cluster," a "cluster," or a "cluster node") indicates a set of devices within geolocation proximity. For the purposes of this disclosure, a cross cluster connection indicates a network connection between different cluster nodes.

For the purposes of this disclosure, a master device (also known as a "primary" device, a "grand master" device, or a "leader" device) indicates a special type of device that gets time synchronization data from other master devices or intelligent engines deployed inside the synchronization system, such as a GPS module in communication with a GPS.

For the purposes of this disclosure, an end device (also known as a "leaf" device, a "replica" device, or a "follower" device, all of which may be used interchangeably throughout this disclosure) indicates a name of all non-master devices that is typically connected to one or more master devices.

For the purposes of this disclosure, cross-cluster master devices (also referred to herein as "cluster master devices") indicate a special set of master devices that distribute timestamp offsets between device clusters.

For the purposes of this disclosure, a grand master device indicates a master device that sends synchronization offset requests to other master devices. In many cases, a grand master device is also GPS master device, which is directly connected to a GPS module.

For the purposes of this disclosure, a support vector machine (SVM) indicates a machine learning algorithm that analyzes data for classification and regression analysis. A regression analysis is a set of statistical processes for estimating the relationships among variables. A regression analysis includes many techniques for modeling and analyzing several variables, where the focus is on the relationship between a dependent variable and one or more independent variables. A linear regression is the simplest form of a regression analysis and uses one dependent variable and one independent variable.

A secondary device, also referred to herein as a "leaf node," may refer to a secondary master device (e.g., a master device not in direct communication with the GPS but relied on to send synchronization offsets to end devices), a cluster master device (e.g., a master device not in direct communication with the GPS but relied on to send synchronization offsets to both end devices and other secondary master devices within the cluster), or an end device. An end device may be connected to more than one master device or to another end device. End devices may be disconnected from one master device and reconnected to another master device. End devices may be reassigned to be a master device and vice versa. Master devices can be connected to another master device and one or more end devices.

For the purposes of this disclosure, a probe timestamp may refer to measure of time at the leaf or master device. As used herein, Synthetic Data may refer to information that consists of a combination of artificially generated data and real-world data. As used herein, Synthetic Timestamps may refer to sequence of timestamps that include timestamps generated in the past by different master and leaf devices, timestamps generate in real-time, and timestamps generated algorithmically. As used herein, Geolocation may refer to a geographic location usually specified by longitude and latitude, metro region, post office code, etc.

As used herein, Device Strata (or Device Stratum or Strata or Stratum) may refer to a rank of Master or Leaf Device in the hierarchical semi-layers system of time source. The strata (stratum) represent the distance from the reference clock and is used to prevent cyclical dependencies in the hierarchy. Strata (Stratum) 0 are high-precision timekeeping devices such as atomic clocks, GPS or other radio clocks. They generate a very accurate pulse per second signal that triggers timestamp on a connected computer. Strata (Stratum) 0 devices are also known as reference clocks or Grandmaster devices or GPS Master Devices. Strata (Stratum) "i" are computers whose system time is synchronized to their attached stratum "i−1" devices.

As used herein, Device Health Function or Device Health may refer to a multiparametric function that defines current and historical device behavior relative to time synchronization processes. Low device health means that a device is not a good and reliable source of timestamp offset information and high device health means that device is a good and reliable source of time offset information. A user can avoid use of low health device offset information in final offset aggregation computation or use their offset computation with a low weigh compared to other devices. As used herein, Device Health Score may refer to numerical value defining device health. As used herein, Device Rank may refer to a function that define relative importance and "weight" of device in the offset aggregation process.

As used herein, Bollinger Bands may refer to a parametric statistic widely used in financial time series analysis. The Bollinger Band is described by three set of numbers: average signal, average signal plus standard deviation multiplied by the band coefficient and average signal minus standard deviation multiplied by the band coefficient. Bollinger Bands parameter set includes type of average, average aperture, standard deviation aperture and band coefficient. A user can use Bollinger Bands in timestamp offset analysis to specify and visualize boundaries of timestamp signal fluctuation.

As used herein, Spike Frequencies may refer to a statistic defining how frequently a user can expect offset outliers to appear in a predefined period. As used herein, Timestamp Sequence may refer to an ordered sequence of timestamps {s1, . . . , sn} where timestamp si has always happened before timestamp si+1. Number "n" is a length of sequence. As used herein, Periodic or Regular Timestamp Sequence may refer to a special time timestamp sequence where all timestamps are collected in a fixed period. As used herein, Pre-recorded or Recorded Timestamp Sequence may refer to a timestamp sequence collected and stored in the simulator database. As used herein, Real-time Timestamp sequence may refer to a timestamp sequence delivered real-time from one of the Master Devices. As used herein, Synthetic Timestamp Sequence may refer to a timestamp sequence that includes one or more synthetic timestamps.

As used herein, Simulation Experiment or Simulation Session may refer to a specific single execution of Simulator (e.g., simulator computing system 8) with a predefined setup, timestamp sources, behavior, offsets, etc.

FIG. 1 is a conceptual diagram of an example time synchronization system 1 with a global positioning system (GPS) device 2, a master device 4, multiple leaf nodes 6A-6E (collectively, leaf nodes 6), and one or more simulator computing devices 8, in accordance one or more techniques of the current disclosure. Each of GPS 2, master device 4, and leaf nodes 6 may be examples of the devices defined and described above having like names. In some examples, time synchronization system 1 of FIG. 1 may include or be part of a cloud exchange or cloud exchange fabric 10, as described in further detail below.

Simulator computing system 8 includes one more computing devices that provide a simulation system which allows the building of complex time synchronization systems by testing new offset generation algorithms and assessing the influence of factors such as network load and temperature on precision and accuracy of synchronization. The techniques of this disclosure allow the simulation of clock offset computation and synchronization system operation in heterogeneous distributed network systems, such as a complex network having many different network devices of different types, ages, and vendor sources. Simulator computing system 8 allows a user to set up a virtual time synchronization network, define simulation timestamp sequences, install and test offset generation algorithms, establish and provide results visually and by reports. Data provided by simulator computing system 8 may then be used for programming system 1, such as by configuring master device 4 and leaf nodes 6.

For example, simulator computing system 8 creates, in response to user input, one or more virtual master devices and a plurality of virtual leaf devices in a virtual network system. Simulator computing system 8 selects (e.g., based on user input) data from one or more of real-time clock offset data, prerecorded clock offset data, or synthetically generated clock offset data. In some examples, the prerecorded clock offset data may be obtained by devices of a worldwide network system having devices physically located in different metro areas, and even in multiple different continents. Simulator computing system 8 executes a time synchronization simulation by applying a predefined clock offset generation algorithm to the selected data, and outputs data indicative of results of the time synchronization simulation. Simulator computing system 8 may create, in response to user input, connections between the one or more virtual master devices and the plurality of virtual leaf devices in the virtual network system. The user input specifies connection types, which may be selected from one or more of virtual circuit connections via a cloud exchange, direct cross-connects, metro-connection, or connection via the Internet.

In some examples, simulator computing system 8 may execute a simulation application with multiple processors or multiple devices. One or more such processors or devices may be located within a public, private, or hybrid cloud. A computing device of the computing system may execute components of the simulation application as a virtual machine executing on underlying hardware. One or more of such components may execute as one or more services of an operating system or computing platform. One or more of such components may execute as one or more executable programs at an application layer of a computing platform. In other examples, functionality provided by a module could be implemented by a dedicated hardware device.

In a heterogeneous network system, different network devices include hardware devices having different CPUs, NIC cards, operating systems, temperature of the device. These devices run different tasks, have different connections and are under different network loads. In many situations developers and researcher needs to test specific system configurations that are not available for real-testing due to the high cost of test or current equipment limitations. For instance, a user may have a single cluster-based Time Synchronization System but is planning to add additional cluster nodes in different geolocations and may need to test potential system behavior with such a system change.

In one case, a user may need to verify his time synchronization system reliability under different network loads or to understand his system monitoring behavior when some master and leaf devices are out of order. In one case, a user may want to test different offset generation algorithms using the different synchronization environments and modeling different sources of noises including network load, temperature jittering, etc. It may be unpractical or in many cases impossible to test each Time Synchronization configuration live.

Simulator computing system 8 allows a user to set up, modify, and operate virtual network environments using a combination of real and simulated devices with different parameters. Simulator computing system 8 allows a user to do the following: Set up the Simulation environment, Execute Simulation, Collect Simulation Data, Analysis of Simulated Data, Visualize Results of Simulation. Simulator computing system 8 simulates worldwide heterogenous network time synchronization. Simulator computing system 8 may receive real-time signals from a wide distribution of devices (e.g., from master device 4 and leaf nodes 6, in the simplified example of FIG. 1), as well as previous time sequences, which allows for simulation of different types and weights of signals. Simulator computing system 8 can add some noise into the simulation as well.

Simulator computing system 8 collects data from a geographically distributed set of devices to measure and collect the information to be used in the simulations to have real-time, up-to-date offset data. In some examples, simulator computing system 8 uses cloud exchange fabrics (e.g., cloud exchange fabric 10) to collect the data from the devices.

Simulator computing system 8 allows a user to more easily test proprietary algorithms, using one universal system. Simulator computing system 8 can run simulation using an algorithm with this particular set of data. In some examples, Simulator computing system 8 presents a special application programming interface (API) to receive the algorithms from the users. Simulator computing system 8 can generate the synthetic information, and perform desynchronization/network load simulations. Simulator computing system 8 allows for simulation of behavior of a distributed network system, rather than just a single device or per device simulation.

One example implementation environment for the techniques described herein is within data centers. Data centers may house multiple different types of devices, each owned by different entities, but each of the devices may be linked inside this overall data center structure. Some devices within the data center may exchange data with other devices in the same data center, but may also exchange data with devices located in data centers in different geographic/metropolitan areas. As such, data centers may implement the techniques described herein to efficiently and precisely synchronize the clocks on the devices within the same data center, as well as with devices in remote date centers in different geographical areas. In this way, the techniques described herein may be implemented as a downloadable software plugin on customer equipment in a data center that enables a device in the data center to perform the time synchronization processes as described herein. The techniques described herein may balance multiple characteristics, including scalability, versatility, precision, cost, security, and redundancy.

In some instances, prior to master device 4 performing a time synchronization process, GPS 2 may be configured to send a timestamp in a data packet to master device 4. Master device 4 may receive the timestamp and synchronize an internal clock on master device 4 to the timestamp received from GPS 2.

As defined above, leaf nodes 6, also referred to herein as a "secondary device," may refer to secondary master devices (e.g., a master device not in direct communication with the GPS but relied on to send synchronization offsets to end devices), cluster master devices (e.g., a master device not in direct communication with the GPS but relied on to send synchronization offsets to both end devices and other secondary master devices within the cluster), end devices, or any combination thereof. Master device 4 may be configured to perform a time synchronization process with any of leaf nodes 6, either individually or in combination. As such, master device 4 may be configured to perform a time synchronization process directly with end devices, with secondary master devices within a same cluster as master device 4, or with cluster master devices in other clusters separate from the cluster that contains master device 4. In some examples, master device 4 may be one of a set of redundant master devices of time synchronization system 1, and the set of redundant master devices may include one or more backup master devices (not shown).

The Precision Timing Synchronization System (Synchronization System) described herein enables the secure and precise clock synchronization service of multiple network connected devices located in different geographic premises. In some examples, synchronization system 1 may be deployed at a set of geographically distributed network connected devices. Devices may be separated into clusters called device clusters or cluster nodes, e.g., based on geographical locations and other technical characteristics. Each device in synchronization system 1 may belong to a particular device cluster. Each cluster node may include devices that belongs to the service provider and devices that belong to the service users. Service provider devices are called Master Devices and user devices are called Leaf Devices. In the example of FIG. 1, master device 4 may be a service provider device, while leaf nodes 6 may be user devices if master device 4 and leaf nodes 6 are in a same cluster.

A cluster node may include a special component operatively connected to master device 4 (either as a software plugin on master device 4 or a separate hardware component) called the GPS module. The GPS module may be connected to GPS 2 (e.g., a satellite), which generates and distributes precision time signals. Nodes that include a GPS module are called GPS-enabled cluster nodes. GPS-enabled cluster nodes provide access to the satellite-generated precise timestamp source. Synchronization systems may have zero, one, or more GPS-enabled cluster nodes.

Each cluster node may include two types of devices: master (e.g., master device 4) and end devices (e.g., some examples of leaf nodes 6). Master devices may be connected to other master devices or to end devices directly.

Master devices connected directly to GPS modules may be referred to as GPS master devices or grand master devices. Two devices in the system can be connected or disconnected. In many cases, each end device is connected to a single master device, while other examples may include an end device connected to more than one master device or to another end device. The master device can be connected to another master devices and/or one or more end devices.

In some examples, master devices may be separated into several strata. Master devices assigned to the same strata are considered to be similar and master devices assigned to different strata are considered to differ. For instance, all GPS master devices (grandmaster or GPS master) may be assigned to the strata 0 and non-GPS master devices to the strata 1. The GPS master device may have access to more precise timing data than non-GPS master devices. Strata 1 devices generally have less precise sources of timestamps than strata 0 devices. Strata 1 master devices can be connected to strata 2 master devices or directly to the end devices. In general, strata "i" master devices can be connected to strata "i+1" master devices or leaf devices.

One example of a synchronization system includes strata 0 grandmaster devices, strata 1 master devices, and end devices. In heterogeneous systems, several GPS-enabled cluster nodes may exist, as well as numerous non-GPS cluster nodes. GPS-enabled cluster nodes may include both strata 0 and strata 1 master devices. Other cluster nodes may only have strata 1 master devices and sometimes strata 2 master devices.

Further examples of synchronization systems, which may be used in conjunction with time synchronization system 1 and the techniques of this disclosure, may be found in U.S. Provisional Application No. 62/785,513, filed Dec. 27, 2018; U.S. Provisional Application No. 62/800,895, filed Feb. 4, 2019; and U.S. Provisional Application No. 62/843, 166, filed May 3, 2019, the entire content of each which is incorporated herein by reference.

In some cases, the use of publicly available clock synchronization solutions requires configuration, tune ups and maintenance of the dedicated timing servers. These servers can utilize different timing protocols (PTP/NTP) and operating systems (Windows/Linux). Operators need to manually monitor the status of their clocks and server's synchronization status. Timestamps are provided but required clock synchronization configurations and maintenance is expensive and time consuming. Unfortunately, public GPS solutions provide relatively low accuracy due to the delivery of timestamps over the public internet for timestamp delivery and create a significant risk of hacker attacks.

In some examples, time synchronization system 1 uses a distributed infrastructure software solution that provides next generation technology, platform, and services that enable precise, accurate, secure, and scalable clock synchronization in distributed enterprise applications deployed in a heterogeneous network environment.

In some examples, cloud exchange fabric 10 provides a monitoring service that allows web-based monitoring of device clock synchronization. The monitoring service may enable device name and IP-based sorting and searching, multi-resolution detailed and aggregated synchronization offset charting, license control, historical data and advanced analytics.

In some examples, cloud exchange fabric 10 provides a synchronization service allows precise and accurate synchronization of time with the distributed set of Master Devices connected to high-precision GPS antennas. The synchronization service may support both the NTP and PTP standards. The synchronization service is deployed on highly available infrastructure, and provides security via integration with a cloud exchange fabric 10 security system. In these and other examples, simulator computing system 8, monitoring service, and/or synchronization service may be part of a programmable network platform of a cloud exchange, e.g., cloud exchange fabric 10.

Cloud exchange fabric 10 may provide a Precise Timing Platform that enables to create unique user keys for security, authentication, and management of the service, Simple service subscription, client installation, adding and removing client devices, UI-based device clock synchronization monitoring: search by device names and IPs, historical and analytic data, Precise and accurate clock synchronization with NTP and PTP on Linux and Window. The precise timing platform may also provide Scalability: customers can add additional client devices anywhere where the cloud exchange fabric 10 infrastructure is set and available for customers. The precise timing platform may also provide Statistics on clock drift and Access to the service historic data The precise timing platform may also provide highly-available, fault tolerant, horizontally scalable monitoring and synchronizes device clocks with accuracy and precision. The results of synchronization are stored in a distributed redundant database. These proprietary technologies are used to optimize device authentication. They allow for parametric tune up and the ranking of devices and connections.

In some examples, the Precision Timing platform provides a clock synchronization and monitoring solution targeting edge computing applications and built based on colocation infrastructure that support high performance, network reliability, redundancy, and low latency.

In the example of FIG. 1, system 1 includes a cloud exchange fabric 10, which may connect multiple autonomous systems (not shown), one or more of which master device 4 and/or leaf nodes 6 may be members, in accordance with example aspects of the techniques of this disclosure. In some examples, cloud exchange fabric 10 may be a Multi-protocol Label Switching (MPLS) network.

In general, an interconnection platform provides customers of the exchange, e.g., enterprises, network carriers, and SaaS customers, with secure, private, virtual connections to multiple cloud service providers (CSPs) globally. The multiple CSPs participate in the cloud exchange by virtue of their having at least one accessible port in the cloud exchange by which a customer can connect to the one or more cloud services offered by the CSPs, respectively. A cloud exchange allows private networks of any customer to be directly cross-connected to any other customer at a common point, thereby allowing direct exchange of network traffic between the networks of the customers. Customers may include network carriers (or network service providers), enterprises, and other users of cloud services offered by one or more cloud service providers.

A cloud-based services exchange, or "cloud exchange" may be configured and managed to facilitate virtual connections for cloud services delivery from multiple cloud service providers to one or more cloud customers. The cloud exchange may enable cloud customers to bypass the public Internet to directly connect to cloud services providers to improve performance, reduce costs, increase the security and privacy of the connections, and leverage cloud computing for additional applications. In this way, enterprises, network carriers, and SaaS customers, for instance, can integrate cloud services with their internal applications as if such services are part of or otherwise directly coupled to their own data center network. Examples of cloud-based services exchanges are described in U.S. Pat. No. 9,948,552, issued Apr. 17, 2018 and entitled "CLOUD-BASED SERVICES EXCHANGE;" and in U.S. Pat. No. 9,886,267, issued Feb. 6, 2018, and entitled "INTERCONNECTION PLATFORM FOR REAL-TIME CONFIGURATION AND MANAGEMENT OF A CLOUD-BASED SERVICES EXCHANGE;" the entire contents of each of which being incorporated by reference herein.

In some examples, cloud exchange fabric 10 may be part of a cloud-based services exchange that includes interconnection assets configured to connect a customer of the cloud-based services exchange to one or more cloud service providers (CSPs), the plurality of interconnection assets including a virtual circuit by which the customer (e.g., an enterprise customer) accesses a cloud service from a CSP. Cloud exchange fabric 10 may also include an orchestration engine (not shown) configured to modify the interconnection assets.

In some examples, an interconnection platform for cloud exchange fabric 10 exposes a collection of software interfaces, e.g., application programming interfaces (APIs), that allow access to capabilities and assets of the interconnection platform in a programmable fashion. As such, the software interfaces provide an extensible framework that allows software developers associated with customers and partners of the exchange to build software applications that access the interconnection platform that automatically manage interconnection with multiple cloud service providers participating in the interconnection platform. In other words, developers from network services providers, cloud service providers, managed service providers and other enterprises may use the software interfaces exposed by the interconnection platform and defined by the APIs to build custom applications and frameworks for seamless interaction with the interconnection platform to facilitate the delivery of cloud services from cloud service providers to cloud service customers. These software interfaces defined by the APIs enable machine-to-machine communication for near real-time setup and modifications of interconnections, and may also eliminate or reduce the need for human interaction for the entire interconnection setup and management process. In this way, the software interfaces provide an automated and seamless way to establish, un-install, and manage interconnection with multiple cloud providers participating in an interconnection platform.

In some examples, several Masters may be connected to one another via cloud exchange fabric 10. In some examples, cloud exchange fabric 10 connects Grand Master to Masters. Leaf-to-leaf connections may likewise be made via cloud exchange fabric 10. For example, in the example of FIG. 1, leaf node 6A may connect to leaf node 6B via cloud exchange fabric 10. Cloud exchange fabric 10 can connect customer's leaf node device to one or more Masters, including Grand Master. Connecting masters and leaves via cloud exchange fabric 10 connection (e.g., by virtual circuits) may improve precision of time synchronization, including PTP-based synchronization. Cloud exchange fabric 10 connection may improve resilience and reliability of the system. In other examples, rather than being connected to one another by virtual circuits via cloud exchange fabric 10, any of leaf nodes 6 and master device 4 may be interconnected by direct wire connections (e.g., cross-connects), metro-connection, fiber connect, or connected via the Internet. In some examples, these different types of connection options may be selectively configurable by a simulator system for simulating time synchronization in a network such as system 1.

Figure 2:
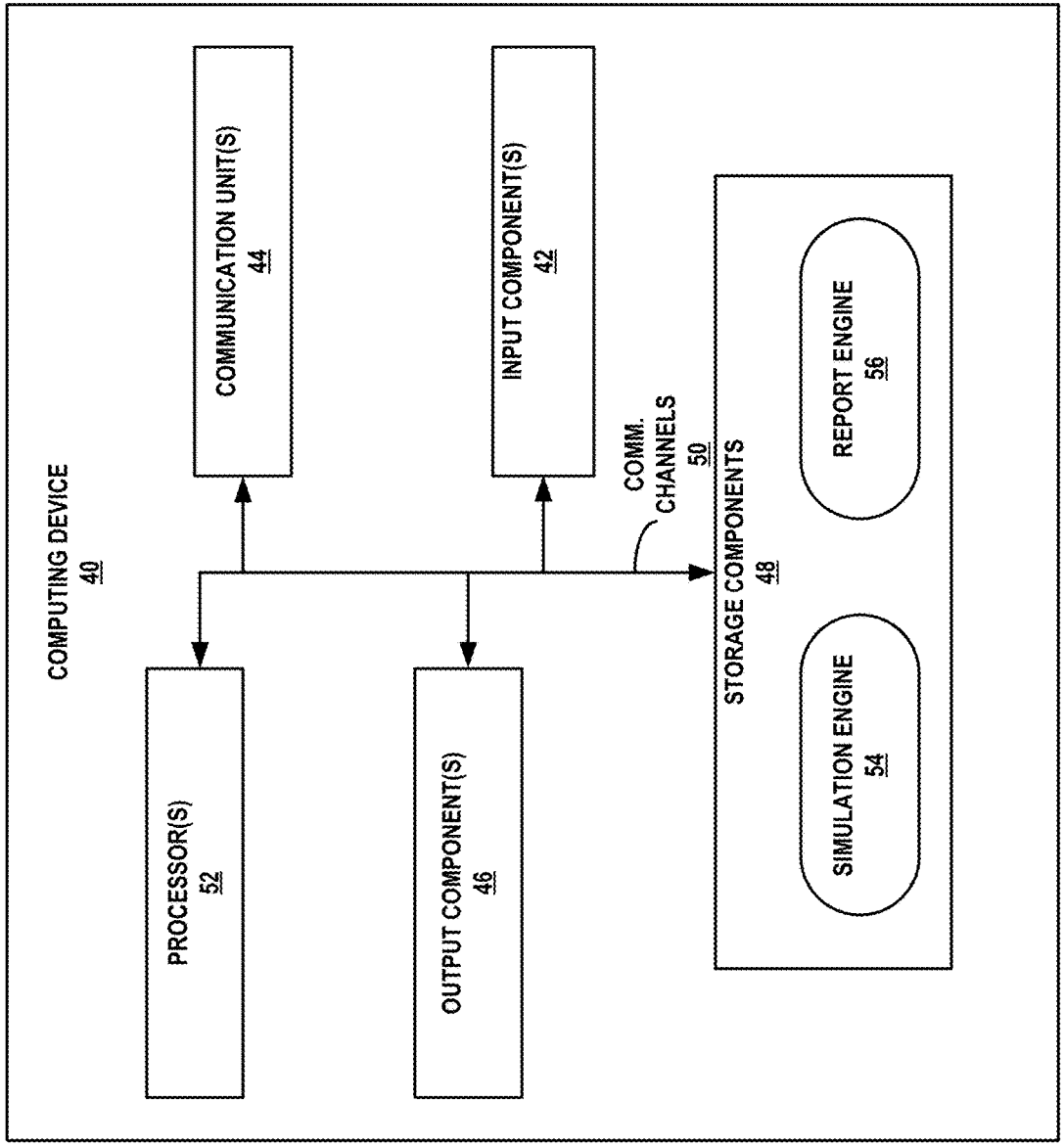
FIG. 2 is a block diagram of a more detailed view of a computing device that may be configured to perform one or more techniques in accordance with the current disclosure.

FIG. 2 is a block diagram of a more detailed view of a computing device 40 that may be configured to perform one or more techniques in accordance with the current disclosure. Computing device 40 of FIG. 2 is described below as an example device of simulator computing system 8 of FIG. 1. FIG. 2 illustrates only one example of computing device 40, and many other examples of computing device 40 may be used in other instances and may include a subset of the components included in example computing device 40 or may include additional components not shown in example computing device 40 of FIG. 2. In some examples, simulation engine 54 and report engine 56 may be components of different devices.

As shown in the example of FIG. 2, computing device 40 includes one or more processors 52, one or more input components 42, one or more communication units 44, one or more output components 46, and one or more storage components 48. Storage components 48 of computing device 40 include simulation engine 54 and report engine 56. Communication channels 50 may interconnect each of the components 42, 44, 46, 48, 52, and 54 for inter-component communications (physically, communicatively, and/or operatively). In some examples, communication channels 50 may include a system bus, a network connection, an inter-process communication data structure, or any other method for communicating data.

One or more communication units 44 of computing device 40 may communicate with external devices, such as GPS 2 or leaf nodes 6 of FIG. 1, via one or more wired and/or wireless networks by transmitting and/or receiving network signals on the one or more networks. Examples of communication units 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

One or more input components 42 of computing device 40 may receive input. Examples of input are tactile, audio, and video input. Input components 42 of computing device 40, in one example, includes a presence-sensitive input device (e.g., a touch sensitive screen, a PSD), mouse, keyboard, voice responsive system, video camera, microphone or any other type of device for detecting input from a human or machine. In some examples, input components 42 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like).

One or more output components 46 of computing device 40 may generate output. Examples of output are tactile, audio, and video output. Output components 46 of computing device 40, in one example, includes a PSD, sound card, video graphics adapter card, speaker, cathode ray tube (CRT) monitor, liquid crystal display (LCD), or any other type of device for generating output to a human or machine.

One or more processors 52 may implement functionality and/or execute instructions associated with computing device 40. Examples of processors 52 include application processors, display controllers, auxiliary processors, one or more sensor hubs, and any other hardware configure to function as a processor, a processing unit, or a processing device. Simulation engine 54 and/or report engine 56 may be operable by processors 52 to perform various actions, operations, or functions of computing device 40. For example, processors 52 of computing device 40 may retrieve and execute instructions stored by storage components 48 that cause processors 52 to perform the operations of synchronization engine 54 and/or report engine 56. The instructions, when executed by processors 52, may cause computing device 40 to store information within storage components 48.

One or more storage components 48 within computing device 40 may store information for processing during operation of computing device 40 (e.g., computing device 40 may store data accessed by synchronization engine 54 and/or report engine 56 during execution at computing device 40). In some examples, storage component 48 is a temporary memory, meaning that a primary purpose of storage component 48 is not long-term storage. Storage components 48 on computing device 40 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 48, in some examples, also include one or more computer-readable storage media. Storage components 48 in some examples include one or more non-transitory computer-readable storage mediums. Storage components 48 may be configured to store larger amounts of information than typically stored by volatile memory. Storage components 48 may further be configured for long-term storage of information as non-volatile memory space and retain information after power on/off cycles. Examples of non-volatile memories include magnetic hard discs, optical discs, floppy disks, Flash memories, or forms of electrically programmable memories (EPROM) or electrically erasable and programmable (EEPROM) memories. Storage components 48 may store program instructions and/or information (e.g., data) associated with synchronization engine 54 and/or report engine 56. Storage components 48 may include a memory configured to store data or other information associated with synchronization engine 54 and/or report engine 56.

Figure 3:
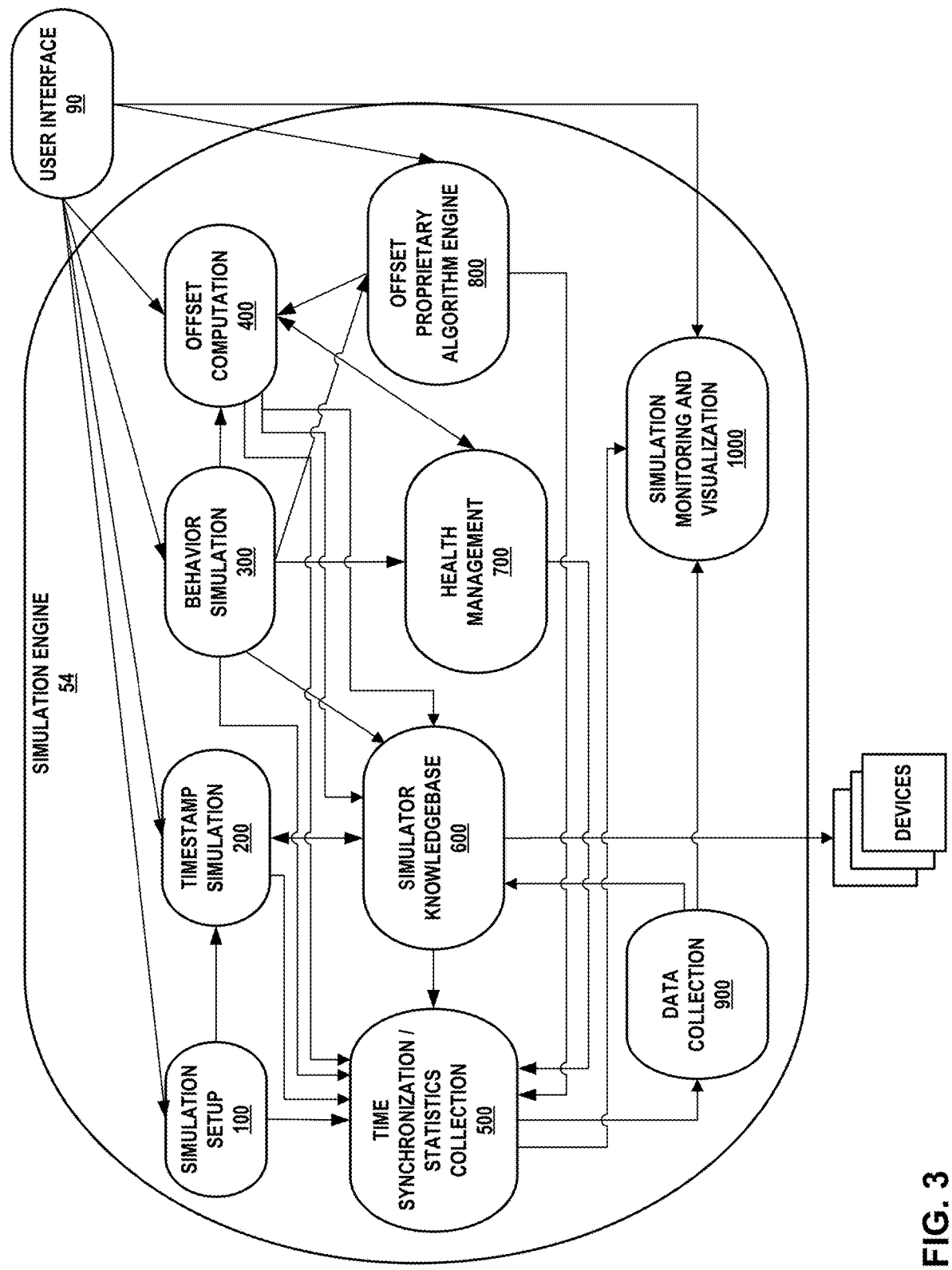
FIG. 3 is a conceptual diagram illustrating an example architecture of a simulation engine configured to perform one or more techniques in accordance with the current disclosure.

Simulation engine 54: is described in further detail in FIG. 3. In some examples, Simulation engine 54 operates in several modes or regimes. For example, simulation engine 54 may use the following operational modes: Simulation Setup Mode; Simulation Execution Mode; Simulation Data Collection and Analysis Mode; and Simulation Monitoring and Visualization Mode.

Report engine 56 generates a simulation report for the network based on at least the results of one or more time synchronization simulations executed by simulation engine 54. In some examples, report engine 56 generates a report comparing results of multiple simulations, such as simulations performed using different parameters, including different offset computation algorithms.

Report engine 56, in some instances, may output for display on a display device (e.g., one of output components 46), a graphical indication of the simulation report. The graphical indication could be any visual item that depicts the one or more simulation characteristics in a way that is understandable to the user, such as with a graphical output or a textual output. Report engine 56 may also modify the graphical indication by modifying a visual characteristic of the graphical indication, such as one or more of a resolution, a chart type, and a device status.

FIG. 3 is a conceptual diagram illustrating an example architecture of a simulation engine 54 configured to perform one or more techniques in accordance with the current disclosure. Simulation engine 54 of FIG. 3 is described below as an example of simulation engine 54 of FIG. 2. FIG. 3 illustrates only one particular example of simulation engine 54, and many other examples of simulation engine 54 may be used in other instances and may include a subset of the components included in example simulation engine 54 or may include additional components not shown in example simulation engine 54 of FIG. 3.

Simulation engine 54 may comprise processing circuitry. In the example of FIG. 3, simulation engine 54 includes example modules including simulation setup 100, timestamp simulation 200, behavior simulation 300, offset computation 400, Time Synchronization and Statistics Collection 500, Simulator Knowledgebase 600, Health Management 700, Offset Proprietary Algorithm Engine 800, Data Collection 900, and Simulation Monitoring and Visualization 1000. Various components, such as simulation setup 100, timestamp simulation 200, behavior simulation 300, offset computation 400, Offset Proprietary Algorithm Engine 800, and Simulation Monitoring and Visualization 1000, may be configured based on input received via user interface 90, allowing for customization of simulation engine 54. User interface 90 may be one or more of input components 42 of FIG. 2. The functionality of each is described below. In some examples, different components or components shown as components of simulation engine 54 may be components of different devices such that simulation engine 54 is distributed among multiple devices, such as multiple real or virtual machines.

Simulation engine 54 operates in several modes or regimes. For example, simulation engine 54 may use the following operational modes: Simulation Setup Mode; Simulation Execution Mode; Simulation Data Collection and Analysis Mode; and Simulation Monitoring and Visualization Mode. Each operational mode is described below.

Simulation Setup Mode: The Setup Mode allows users to define the synchronization system environment, including Cluster Nodes (geolocation, Master Devices and device stratum, device connections, leaf devices and connections). The Setup Mode allows users to define simulation timestamp sequences, device behavior, offset computation method. For each pair of connected devices, setup mode allows to set: Network load; Device strata, health, and rank;

Device type: real or synthetic; For synthetic device: device ID from the list of supported synthetic devices; and Connection health and rank.

Synthetic device is a device that uses synthetic timestamp sequences simulated by simulation engine 54. Synthetic timestamp sequences are timestamps sequences that include one or more synthetic timestamps. Synthetic timestamp is a timestamp created artificially using a timestamp generation mathematical algorithm.

Simulation Execution Mode: In the execution mode, the system performs simulation process for a certain period of time. A single execution process for a user-configurable time period and fixed setting is referred to herein as a "Simulation Experiment" or "Simulation Session." For simplicity this disclosure will use terms "Experiment" or "Session". The Simulator allows to run experiment using: real, filtered, and synthetic timestamps; real, filtered, and proprietary offset generation algorithms; and different network loads.

Each session associated with pre-defined start and end time, and session ID for registration, filtering, analysis, and reporting. In one example aspect, Simulator uses real timestamps from existing Master and non-master (leaf) devices and real offsets. In one example aspect, Simulator uses real timestamps and offsets generated by proprietary (synthetic) offset generation algorithms. It would allow the testing and comparing of different offset generation models using real-time generated offsets.

In one example aspect, Simulator uses a mix of real timestamps and synthetically generated timestamps. In one example aspect, synthetically generated timestamps are created using different real or artificially generated network delays models. In one example aspect, the Simulator is running sessions based on pre-defined experiment schedules. In one example aspect, the network load is a parameter defining a set of experiments, where network load is changing from 0 to 100 percent with a step of h percent during the N minutes period.

Simulation Data Collection and Analysis Mode: The Data Collection and Analysis mode enables the Simulator to: register and store results of experiments in the Simulator database; filter data by deleting outliers and noise; aggregating data by using one of pre-defined methods of data aggregation; generating different statistics, including but not limited to moving averages, variation, volatility, etc.

Figure 11:
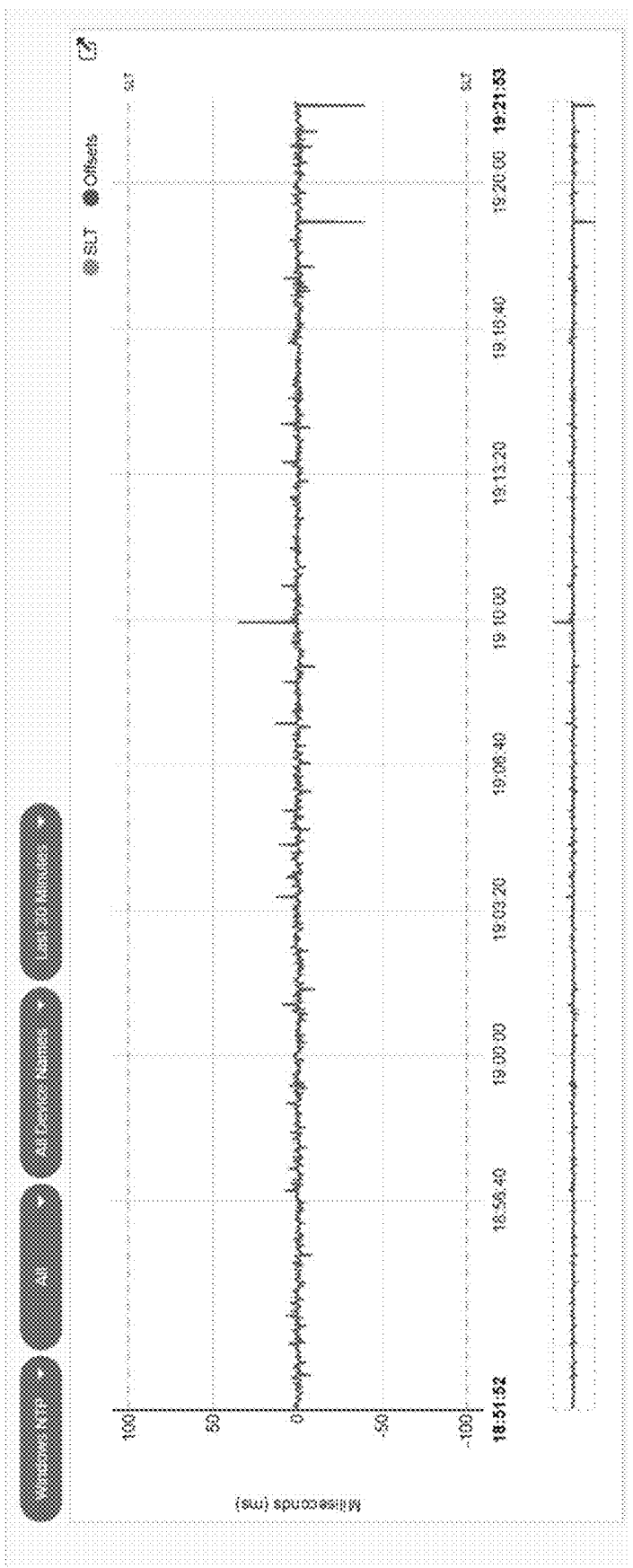
FIG. 11 is a conceptual diagram illustrating an example user interface that includes a report generated according to one or more techniques of this disclosure.
Figure 12:
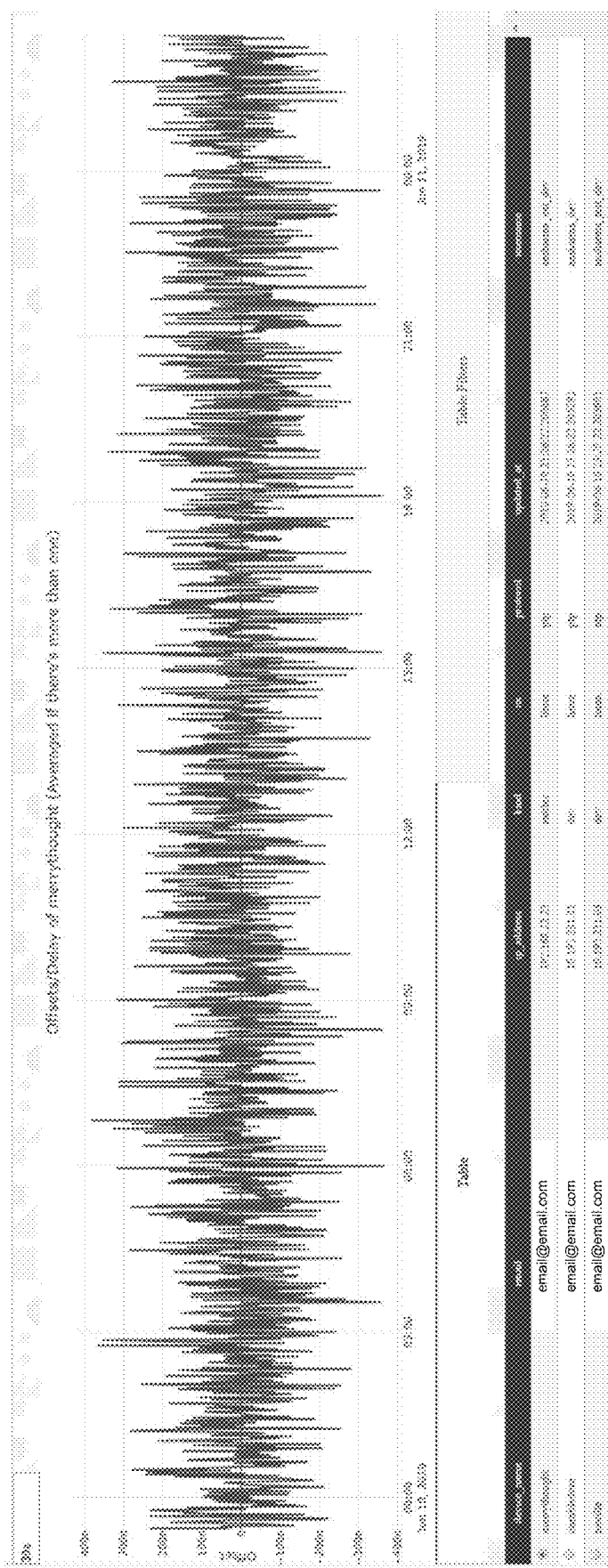
FIG. 12 is a conceptual diagram illustrating an example user interface that includes a report generated according to one or more techniques of this disclosure.

Simulation Visualization and Monitoring Mode: In the Visualization and Monitoring Mode the Simulator allows to visualize results of simulation and monitor simulation sessions. FIGS. 11 and 12 illustrate different visual presentations of simulation sessions.

Simulation Reporting Mode and Module: In the Reporting Mode, simulation engine 54 causes report engine 56 to generate different reports based on the user's request.

In some examples, Simulator (simulation engine 54) operates as follows. The user starts Simulator (simulation engine 54) by setting simulation experiments (sessions). Via user interface 90, the user chooses a setting mode of the Simulator and defines virtual Master and virtual non-master (leaf) nodes, their geolocation, connections, sources of timestamps, offset generation algorithm, network load, health functions and device ranks. In defining the virtual master and virtual leaf nodes, the user specifies, via user interface 90, which devices (real or synthetic) will be considered in the simulation process. In this manner, the system receives settings defining an environment of a plurality of devices, and the selected characteristics of the devices.

Simulation engine 54 receives via user interface 90 indications of user input indicating a selected type of timestamps and offsets the user has selected to use in the simulation session. Simulation engine 54 may select, in response to the user input, one or more of real-time clock offset data, pre-recorded clock offset data, or synthetically generated clock offset data. Simulation engine 54 receives via user interface 90 indications of user input defining device behavior, offset computation, network load, device ranking and health.

In this manner, user first must set up computing device 40, specifically simulation engine 54. Computing device 40 is a versatile apparatus, having several modus of operandi.

After the setting is finished, a user can execute a set of experiments (sessions) of time synchronization simulation by applying one or more predefined clock offset generation algorithms to the selected data. In different sessions, a user can execute time synchronization simulation for different offset computation models, different network loads and delays, different combinations and geolocation of master and leaf nodes.

For each experiment, simulation engine 54 collects data and stores new data into simulator knowledgebase. Simulation engine outputs data indicative of the results of the time synchronization simulation. Simulation engine 54 provides data to report engine 56 for outputting multi-resolution visualization, experiment monitoring and reporting. In some cases, report engine 56 outputs data for display.

The major functionality of simulation engine 54: Simulate heterogeneous network of any complexity. Test different sources of timestamps (real-time, pre-recorded, synthetic), Verify and compare different offset computation algorithms, Simulate network load and simulate synchronization with network load, Visually represent results of offset simulation, Enable synchronization data analysis and comparison, Data collection, and Maintenance and support of experiment and data knowledgebase.

Some examples of simulation engine 54 unique functionalities: Capability to setup and estimate behavior of distributed heterogeneous Time Synchronization System, Create simulation experiments using real-time, pre-recorded and synthetic timestamps, Compute offsets using proprietary algorithms and compare them. Synthetic and real timestamps and offset data use; Analyze device connection health and ranking to maximize quality of synchronization, Analyze and Visualize data, and Monitor virtual devices time synchronization behavior.

Simulation Setup 100 ("Component 100") is responsible for setup and management of general system control cluster control and device connection control. Component 100 allows to define and configure: number of GPS and non-GPS clusters, GPS and non-GPS clusters geo location, for each Cluster Node: master device's strata, leaf device operation system (for instance, Linux, Windows) and leaf device supported protocol (PTP, NTP, or proprietary); for each Device connection: cross-cluster and in-cluster master device connection parameters (rank, health, network load), master-leaf device connection parameters (rank, health, network load); for each Device: device parameters (rank, health, device type (synthetic or real)).

Component 100 receives setup requests (orders) from the Simulator Operator or the Simulator User. Component 100 validates requests propagate validated data to the Component 200 and Component 500. Component 100 unique functionalities: Capability to set multiple Cluster Nodes in different geolocations. Capability to set each Cluster Node topology (devices and their connections), Capability to assign ranks, health, and network load to each device connection and rank and health to each device. Capability to simulated different OS and time synchronization protocol for each leaf device.

Component 100 works as follows. Component 100 receives parameters entered by simulator operator (user) over the connection 110. Each parameter has a predefined (default) value. Component 100 enables parameter entry and validation. Validated values are stored in control storage.

The list of parameters supported by typical Simulator implementation includes but is not limited to: number of cluster nodes, cluster node geolocation, cluster node master strata, master rank and health function, cluster node master/master and master/leaf connections, network load for each connection, timestamp source (real, synthetic), offset source (real, proprietary), offset generation model and algorithm, and supported OS and synchronization protocol (NTP, PTP, Proprietary).

Number of cluster nodes would affect total network load and master device load. Cluster node geolocation also affect network throughput and potential load. Cluster node master strata affect achievable precision. 0-stratum is a grandmaster device. Each stratum is losing from 10 ns up to 10 us (microsecond) of total precision. Master ranks and health function define how reliable master device is in a list of other master devices and what is a probability that it would lose connection or would be overloaded by other processes and how fast is connected network. Time sources define expected experiment: e.g., to simulate network or test offset generation algorithm. Simulation computing device 8 can be used to test multiple different offset generation algorithms and analyze and compare results of their operation. Simulation computing device 8 can select from among the multiple offset generation algorithms to choose one for application to a synchronization system such as system 1.

In some examples, simulator computing system 8 will modify a synchronization system based on the data indicative of the results of the simulation. For example, simulator computing system 8 will provide configuration information to master device 4 in system 1. In some examples, simulator computing system 8 will configure one or more real master devices (e.g., master device 4) and a plurality of real leaf devices (e.g., leaf devices 6) to apply the predefined clock offset generation algorithm to determine clock offsets during operation of the real master devices and real leaf devices.

Figure 4:
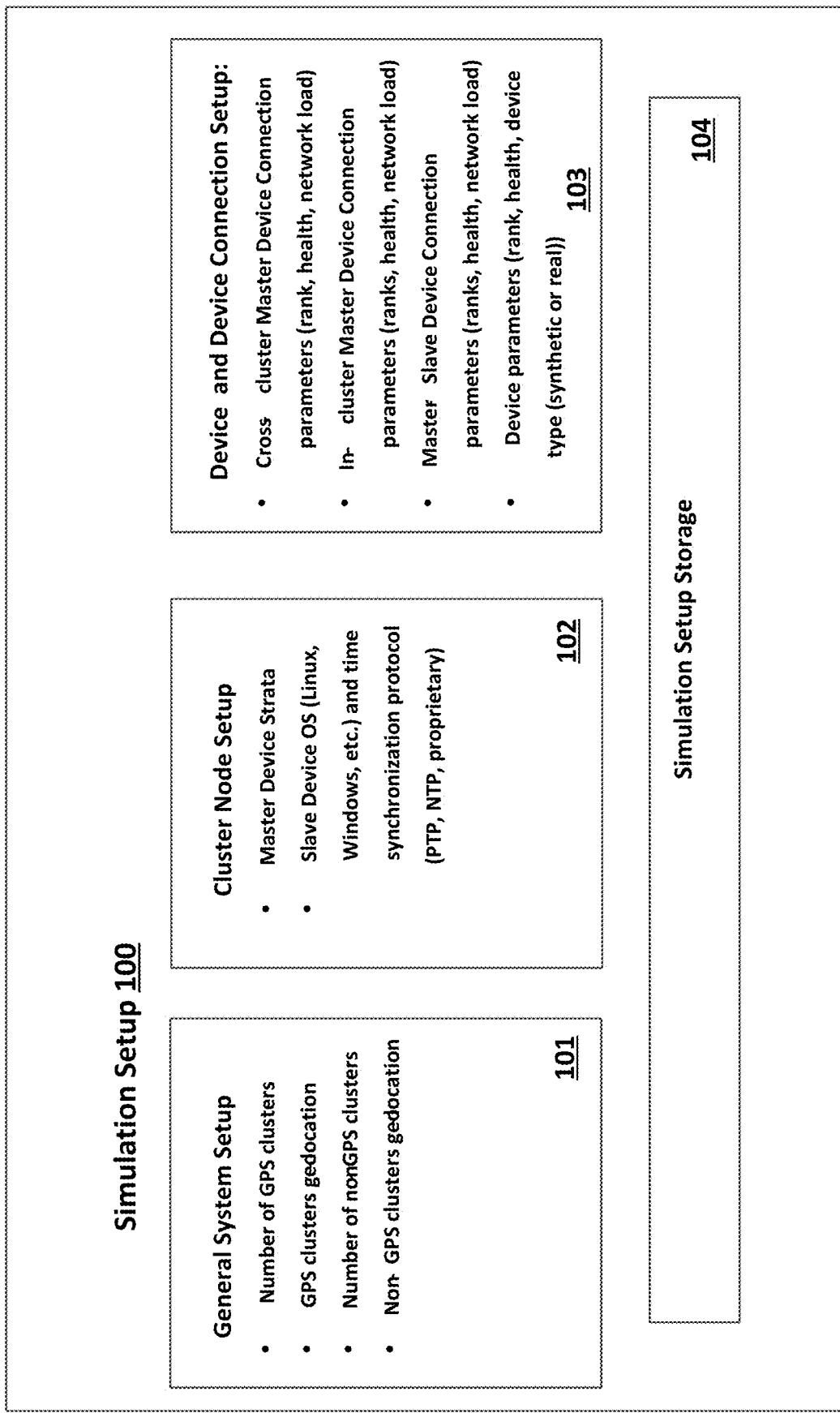
FIG. 4 is a conceptual diagram illustrating an example architecture of a simulation setup module configured to perform one or more techniques in accordance with the current disclosure.

FIG. 4 is a conceptual diagram illustrating an example architecture of a simulation setup module configured to perform one or more techniques in accordance with the current disclosure. FIG. 4 illustrates Simulation Setup 100 of FIG. 3 in further detail. In the example of FIG. 4, Simulation Setup 100 includes General System Setup 101, Cluster Node Setup 102, Device and Device Connection Setup 103, and Simulation Setup Storage 104.

General System Setup 101 controls general setup: number of GPS and non-GPS clusters and GPS and non-GPS clusters geo-location. Cluster Node Setup 102 controls Cluster Nodes setup: master device strata, leaf device OS (i.e. Linux, Windows) and time synchronization protocol (PTP, NTP, Proprietary).

Device and Device Connection Setup 103 controls Device and Device Connection Control setup. For each Device connection the component manages: cross-cluster and in-cluster master device connection parameters (rank, health, network load), master-leaf device connection parameters (rank, health, network load). For each device the component manages: device parameters (rank, health, device type (synthetic or real)). Simulation Setup Storage 104 stores validated values of setup parameters Returning to FIG. 3, Component 100 receives data from user interface 90 (operator). Component 100 sends data to Component 200 and to Component 500 Time Synchronization. Timestamp Simulation 200 ("Component 200") controls timestamps simulation. Each simulation session is using an ordered sequence of timestamps, named timestamp series:

$$Tn=(t_1, \ldots, t_n),$$

where $t_i$ is a timestamp "i" and "n" is a size of series.

The component 200 allows to describe and generate timestamp series. Each individual timestamp $t_i$ can be: artificially generated, taken from database of timestamp series; or received in real-time.

If timestamp series Tn consists of timestamps collected periodically, then such a timestamp series is called a regular series. For instance, frequency of timestamp collection can be 1 second, 1 minute, etc.

The techniques of this disclosure allow one or more timestamps in the series Tn to be artificially generated or taken from different pre-reordered sequences of timestamps. Such series would be called "synthetic" series. The simulation system described herein allows the collecting of timestamps in real-time from one or more master or leaf devices, such as from master device 4 and leaf nodes 6. The sequences collected in real-time will be called real-time series. In some examples, simulator computing system 8 polls each of each of leaf nodes 6 and master device 4 to obtain timestamp data.

Simulator computing system 8 allows a user to create regular and irregular synthetic, pre-defined, or real-time timestamp series. In one example aspect, a user can create desired timestamps series Tn by taking subset of one of timeseries stored in the timeseries database. In one example aspect, a user can generate timestamp series using mathematical formula. For instance, a timestamp $t_k$ can be computed as $tk=a*k+b+norm(0,s^2)$, where a and b are coefficients, k—is an order of timestamp and $norm(0,s^2)$ is a number generated by $Norm(a,b^2)$ data generator using normal distribution function with mean "a" and dispersion "b".

The timestamp sequence size is defined by number of timestamps or measurement period.

Timestamp simulation 200 ("Component 200") allows to choose type of timestamp sequences for the simulation, construct them using real-time, pre-recorder or synthetic data.

Component 200 verifies and corrects timestamp generation extract timestamp data from simulator knowledgebase 600, which provides "Timestamp data knowledgebase," and stores newly generated timestamp series data to simulator knowledgebase 600.

Component 200 unique functionalities are: Support of synthetic timestamp generation by combining real-time, pre-recorded and artificially generated data. Mechanism of generation of Timestamp Sequence of any level of complexity. Extraction and storing timestamp series in Component 600 "Timestamp data knowledgebase."

Timestamp sequence type: regular (constant frequency) or irregular (variable frequency), Timestamp sampling frequency constant or function; Timestamp sequence size; Synthetic, real-time, and pre-define sequences.

Component 200 receives values from Component 100, for each connected device and device connection. Component 200 receives from User timestamp series description parameters from user interface 90. Component 200 verifies entered user values and aggregates verified values with data from Component 100. Component 200 sends request to Component 600 to provide synthetic timestamp values for the future time synchronization modeling and send newly generated Timestamp sequences into Component 600. Component 200 sends data to Component 600 Timestamp Data Knowledgebase.

Component 300 is Behavior Simulation. Component 300 allows user to simulate device synchronization and desynchronization and network load. Unique functionalities: Allows to model device synchronization and desynchronization. Supports periodic, statistical, and proprietary desynchronization. Supports network load simulation by setting network load function for each pair of devices or for device groups and clusters.

Component 300 supports several methods of device synchronization and desynchronization. A user can define: Periodic desynchronization, Statistical desynchronization, Proprietary defined desynchronization.

Desynchronization in Time Synchronization Systems may be unavoidable. Simulation engine 54 allows to model different type of desynchronizations, such as by selecting a desynchronization schedule. This may be needed to test offset jitters and predict synchronization precision. The system is configured to test effect of periodic desynchronization. An advanced offset generation algorithm should "discover or recognize" period of desynchronization, predict it, and protect offset computation. Statistical desynchronization cannot be easily discovered but a good algorithm should minimize offset computation jitter in many special cases. User can set a "proprietary" desynchronization model (schedule) to behavior simulation component 300 via user interface 90 and simulation engine 54 will follow such schedule.

Component 300 support several methods of network load simulation: Piece-constant load when network is loaded with a constant volume for a pre-defined period; Function-based load when network load is defined by math function. Example: sawtooth wave function. Random load when network load is defined by one of random function generator with specific parameters. Example: Poisson load generation. In one example aspect, a user can create a library of network load functions and use them by accessing load function library. In one example aspect, a user can use open source load testing tools, network traffic generators, etc.

Component 300 receives data from Operator (User) from user interface 90. Operator defines Behavior parameters and choose network load method. Component 300 sends data to Component 400. Offset Computation. Component 300 sends network load data and synchronization status to block 500 Time Synchronization. Component 300 sends network load data and synchronization status to Component 700, Ranking and Health Function.

Figure 5:
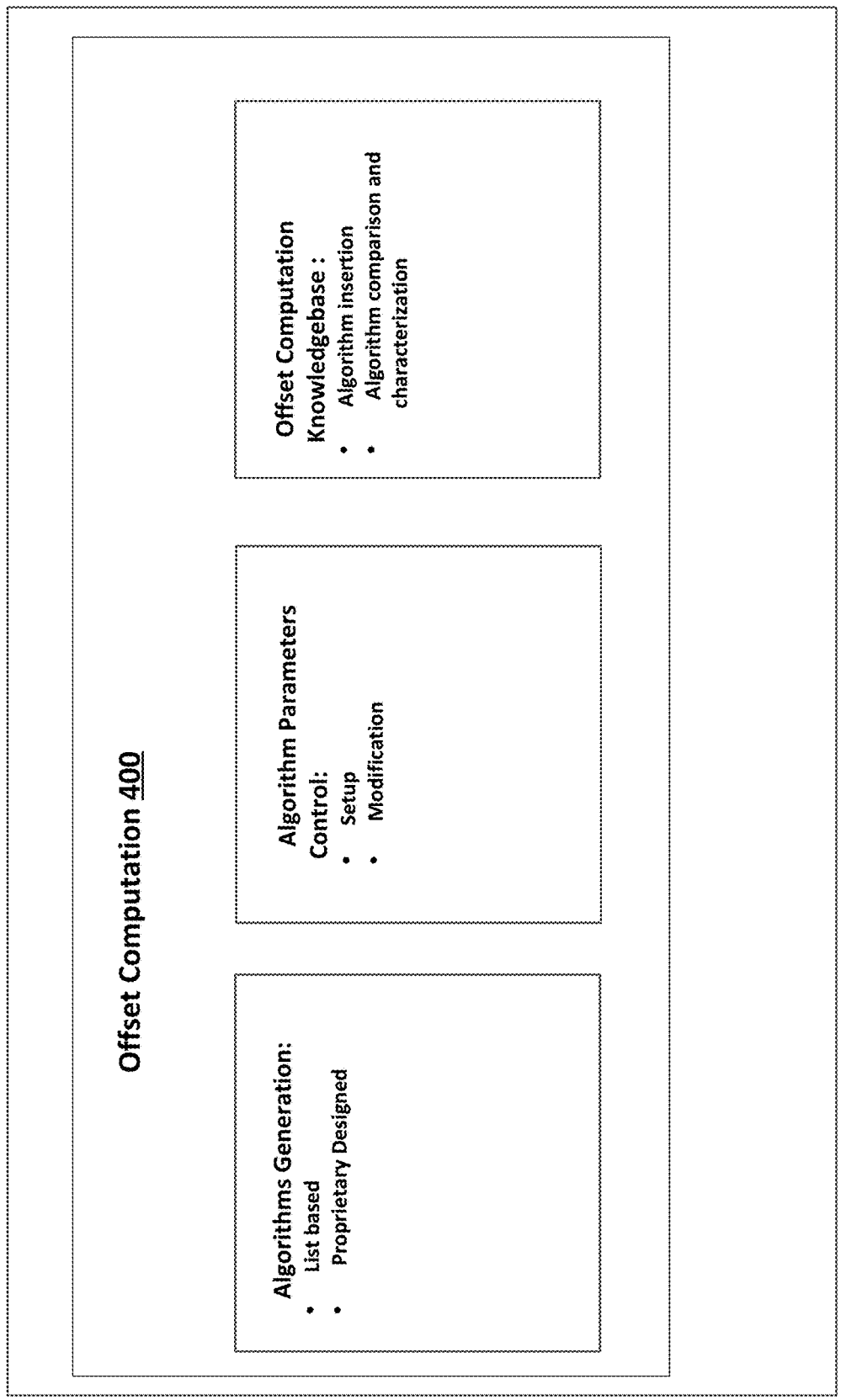
FIG. 5 is a conceptual diagram illustrating an example architecture of an offset computation control system configured to perform one or more techniques in accordance with the current disclosure.

FIG. 5 is a conceptual diagram illustrating an example architecture of an offset computation control system configured to perform one or more techniques in accordance with the current disclosure. Offset Computation 400 ("Component 400") provides an offset computation control system. As shown in further detail in FIG. 5, offset computation 400 of FIG. 3 includes algorithms generation (list based or proprietary designed), algorithm parameters control (setup, modification), and interacts with offset computation knowledgebase 600, including for algorithm insertion, algorithm comparison and characterization.

Component 400 generates offsets for each pair of connected devices for each simulation experiments. The Simulator supports different offset generation mechanisms. Offsets can be: generated (provided) automatically when timestamp data and offsets are received from real-time sources; loaded from Component 600 when the experiment is using pre-recorded timestamps and offsets; computed using proprietary offset computation algorithms (Component 800).

Component 400 unique functionalities include to provide choice of real-time offsets from devices; pre-recorded offsets from knowledge database, and offsets generated by proprietary algorithms. Component 400 works as follows: Operator (User) pre-defines a method of offsets generation. User can choose offsets generated in real-time by existing pair of devices. User can choose pre-recorded offsets together with pre-recorded Timestamp series. User can choose one of proprietary algorithms defined and generated by Offset Proprietary Algorithm Engine (Component 800). Offsets are generated or loaded based on Operator's instructions. Offset data is transferred to the Time Synchronization Component 500. Offset data is transferred to Ranking and Health Function Component 700.

Component 400 receives control parameters from Operator (User) from user interface 90 and behavior simulation signals from Component 300. Component 400 receives offset proprietary algorithm from Component 800. Component 400 sends data to Component 500, and Component 700.

Synchronization, Statistic Collection 500 ("Component 500) executes the simulation experiment, generate results, statistics, and delivers them to Data Collection Manager (Component 900) and Simulation Monitor (Component 1000).

Component 500 allows to execute simulation experiments (sessions). Component 500 starts and end simulation experiments, Component 500 formats and forwards data to the simulation monitor (Component 100). Component 500 combines and organizes data from simulation experiment and forward it to data collection manager (Component 900). Component 500 generates multiple statistics, for instance averages, standard deviations, quantiles.

Component 500 receives: simulation setup values from Component 100; Timestamp simulation data from Component 200; Behavior simulation data from Component 300; Offset data from Component 400; Validation data from Component 600; and Offset proprietary algorithm control parameters and ID from Component 800. Component 500 sends data to the Data Collection Manager (Component 900), and Simulation Monitor (Component 1000).

Component 600 is Simulator Knowledgebase. Component 600 stores, edits, monitors timestamp sequences, timestamp offsets, and history of simulation experiments. Component 600 can consist of one or more than one database to enable several levels of security.

Component 600 allows to store, edit, extract, and modify timestamp sequences and offset, experiment-related knowledgebase. The Component 600 receives: Timestamp sequences and associated control data from Component 200; Behavior Simulation from Component 300; Offset Computation data from Component 400; Timestamp and offset data from Master and Leaf Devices ("Devices"), and Collected data from Component 900. Component 600 sends data to the Time Synchronization (Component 500).

Health management module 700 ("Component 700") computes ranking and health functions and health score for each pair of simulated devices. In one example, health management module 700 may compute health scores only for devices, device connections, cluster nodes, or the network as a whole. In other examples, health management module 700 may compute health scores for any combination of devices, device connections, cluster nodes, or the network as a whole. In one example, health management module 700 may compute the health score at a pre-defined time.

In one example, health management module 700 may include a device-level health engine, which computes device and device connection health. Health management module 700 may also include a cluster-level health engine, which computes cluster node and system health.

Health management module 700 may generates health management function $$H_c(t,x,y) \qquad (12)$$

where t is a time, and x and y are connected devices. At a moment of time t, the device-level health engine may collect all available scores from scoring module 110 for devices x and y and their connection (x,y). Then the device-level health engine applies a vector function $H(s_1, \ldots, s_n)$ that aggregates (e.g., compresses) scores $s_1, \ldots s_n$ into a single health score. This compression may include the device-level health engine applying a monotonic function of n variables, such as $f(0, \ldots 0)=0$ and $f(1, \ldots, 1)=1$ for score compression.

In various systems, different health scores have different meanings and may be aggregated differently. In one example, health management module 700 may subdivide health scores can into multiplicative and additive scores and the compression function $H(s_1, \ldots, s_n)$ may be represented as:

$$H(s_1, \ldots, s_n) = G(s_1, \ldots, s_k) * A(s_{k+1}, \ldots, s_n), \qquad (13)$$

where $s_1, \ldots, s_k$ are multiplicative scores, and $s_{k+1}, \ldots, s_n$ are additive scores.

In one example, health management module 700 can use equation (13) in a simple form as $$F_{av}(s_1, \ldots, s_n) = s_1 * \ldots *s_k * \text{Average}(s_{k+1}, \ldots, s_n), \qquad (14)$$

where $\text{Average}(x_1, \ldots x_n)$ is a monotonic function such that $\text{Average}(0, \ldots, 0)=0$. $\text{Average}(1, \ldots, 1)=1$ and $\text{Average}(x_1, \ldots, x_{i+1}, \ldots, x_n) \geq \text{Average}(x_1, \ldots, x_i, \ldots, x_n)$, when $x_i \geq x_{i+1}$.

Health management module 700 may also implement other formulas, such as formulas (15), (16), and (17):

$$F_{min}(s_1, \ldots, s_n) = s_1 * \ldots *s_k * \min(s_{k+1}, \ldots, s_n), \qquad (15)$$

$$F_{max}(s_1, \ldots, s_n) = s_1 * \ldots *s_k * \max(s_{k+1}, \ldots, s_n), \qquad (16)$$

$$F_{med}(s_1, \ldots, s_n) = s_1 * \ldots *s_k * \text{median}(s_{k+1}, \ldots, s_n). \qquad (17)$$

In one example, health management module 700 uses a single multiplicative score $s_{os}$, where all other scores are additive. Health management module 700 may interpret the score $s_{os}$ as a flag that disable devices with unsupported OS's from score computation.

Equation (15) describes the conservative measurement strategy when health management module 700 uses only mostly healthy devices and device connections. The advantage of such strategy is that health management module 700 would minimize measurement outliers. The drawback is that many devices and connection measurement would be excluded from offset computation. Equation (16) represents the opposite (aggressive) strategy, and equation (17) is a medium-aggression strategy.

The cluster-level health engine may compute an aggregated health value for each simulated cluster node and for the simulated network/system at large. The cluster-level health engine may implement the following aggregation formula:

$$F_{av}(s_1, \ldots, s_n) = \text{Average}(s_{k+1}, \ldots, s_n), \qquad (18)$$

where $\text{Average}(x_1, \ldots, x_n)$ is a monotonic function such that $\text{Average}(0, \ldots, 0)=0$. $\text{Average}(1, \ldots, 1)=1$ and $\text{Average}(x_1, \ldots, x_{i+1}, \ldots, x_n) \geq \text{Average}(x_1, \ldots, x_i, \ldots, x_n)$, when $x_i \geq x_{i+1}$. The equation (18) supports minimum/maximum strategies, as well as the usage of weighted averaging when weights can be ranks of simulated connected devices and simulated cluster nodes.

Unique functionalities of the Component 700 are: device, device connection, Cluster Node, and Synchronization System health function computations; concept of multiplicative and additive health scores; integration of offset computation strategy with health functions; use health functions in timestamp offset computation. Component 700 receives data from Component 300, for each connected device and device connection. Component 700 received offset computation data form Component 400. Component 700 computes aggregated health scores for each simulated pair of devices, simulated Cluster Node, and simulated System at Large. Component 700 allows to adapt the health computation module for different offset computation strategies. Component 700 sends data to Component 800 and to the Component 500.

Component 800 is Offset Proprietary Algorithm Engine 800. Component 800 is responsible for creation, storing, editing, and optimization of proprietary offset generation algorithms. In one example aspect, algorithm of offset computation is developed and provided by the entity providing the simulator. In one example aspect, an algorithm of offset computation is a third-party module that is added to the simulator for third party solution testing and review.

Component 800 enables The Simulator to test multiple competing offset generation algorithm. Component 800 works as follows: User chooses a proprietary offset algorithm to be used in the simulation session. The algorithm can be generated internally by the entity providing the simulator or may be provided by third party for an independent evaluation. For example, a third-party researcher may plug in an offset algorithm using an API provided by the simulator. Parameters of the algorithm are sent to and used in Offset Computation Component 400.

Operator (User) send to the Component 800 a request for the certain algorithm and its parameters (if any). Component 800 sends data to the Component 500 and algorithm parameters to the Component 400.

Component 900 is a Data Collection module 900. Component 900 is responsible for collecting all data from simulated Client Devices and Master Devices. This data includes timestamp sequences, offset sequences, device and connection health scores simulations. Component 900 receives: Timestamp series, offset series, simulated device and connection scores and states from Component 500. Component 900 functionality: Collects, stores, filters, aggregates data. The data collected by Component 900 is unique.

Component 900 works as follows: Component 900 is constantly gathering timing data (timestamps, offsets) from simulated Client Devices, Master Devices and device pairs. Data is filtered and stored. In one example aspect, the filtering process includes of classification of data based on device statuses. Timing data is aggregated. In one example aspect, timing data is aggregated for each simulated Client Device. In one example aspect, timing data is aggregated for each simulated Master Device. In one example aspect, data is aggregated for each simulated pair Client/Master. Aggregated and filtered data is sent to the Component 1000 for monitoring and visualization and is transferred to Component 600.

Component 1000 is Simulation Monitoring and Visualization 1000. Component 1000 allows to control, edit, review, visually observe, and manage Time Monitoring System. The main function of Component 1000 is to allow a user to visually observe Client Device offset from Master Devices over simulation experiments, review and compare experiments. The example of monitoring and visualization system displayed information is shown in FIGS. 11 and 12. Component 1000 receives: Simulation results and Statistics from Component 500; Visualization Requests from the Operator (User) via user interface 90.

Component 1000 main functionality: Client Device offset multiresolution visualization for individual Client Devices and Client Device clusters; Control multiresolution visualization; Statistics and indicators multiresolution visualization for individual Client Devices and Client Device clusters; Control multiresolution Statistics and indicators visualization; Client Device status visualization for individual Client Devices and Client Device clusters; Control status visualization Unique functionality of Component 1000 Monitoring Visualization: Multiresolution visualization of Client Device offsets; Multiresolution visualization of Client Device statistics and indicators; Dynamic device status visualization, Device Cluster aggregated visual data representation.

Component 1000 works as follows: When resolution and visualization information are chosen by user, Component 1000 receives a request to visualize information via the connection to user interface 90. Component 1000 transforms user request into a set of internal requests, e.g., using a transformation engine that transforms high-level user intent data to low level internal requests data. Internal requests data are sent to the Data Collection Component 500. Component 500 packages data and delivers it to the Component 1000 for visualization. Component 1000 sends requests to the Component 500 when user is refreshing the visualization monitor.

Figure 6:
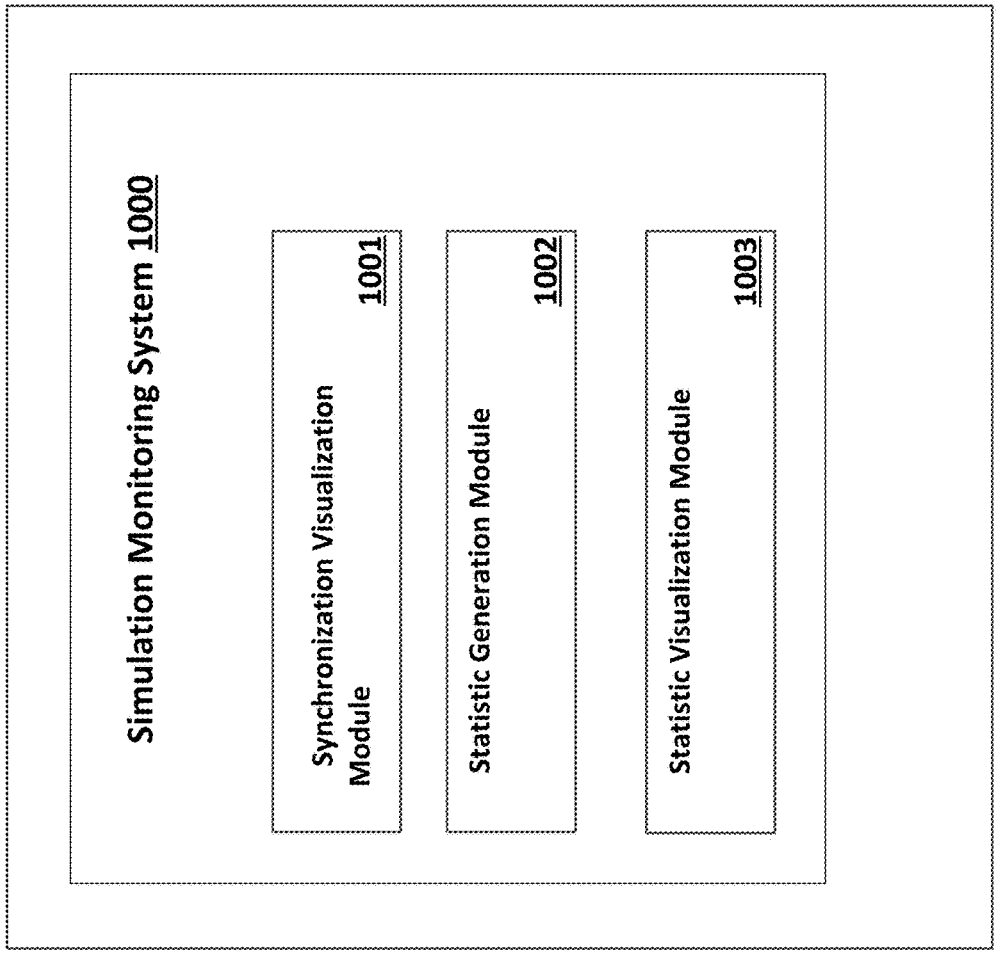
FIG. 6 is a conceptual diagram illustrating an example architecture of a simulation monitoring system configured to perform one or more techniques in accordance with the current disclosure.

FIG. 6 is a conceptual diagram illustrating an example architecture of a simulation monitoring system 1000 of FIG. 3 in further detail, configured to perform one or more techniques in accordance with the current disclosure. In the example of FIG. 6, simulation monitoring system 1000 includes a synchronization visualization module, statistics generation module 1002, and statistics visualization module 1003.

Figure 7:
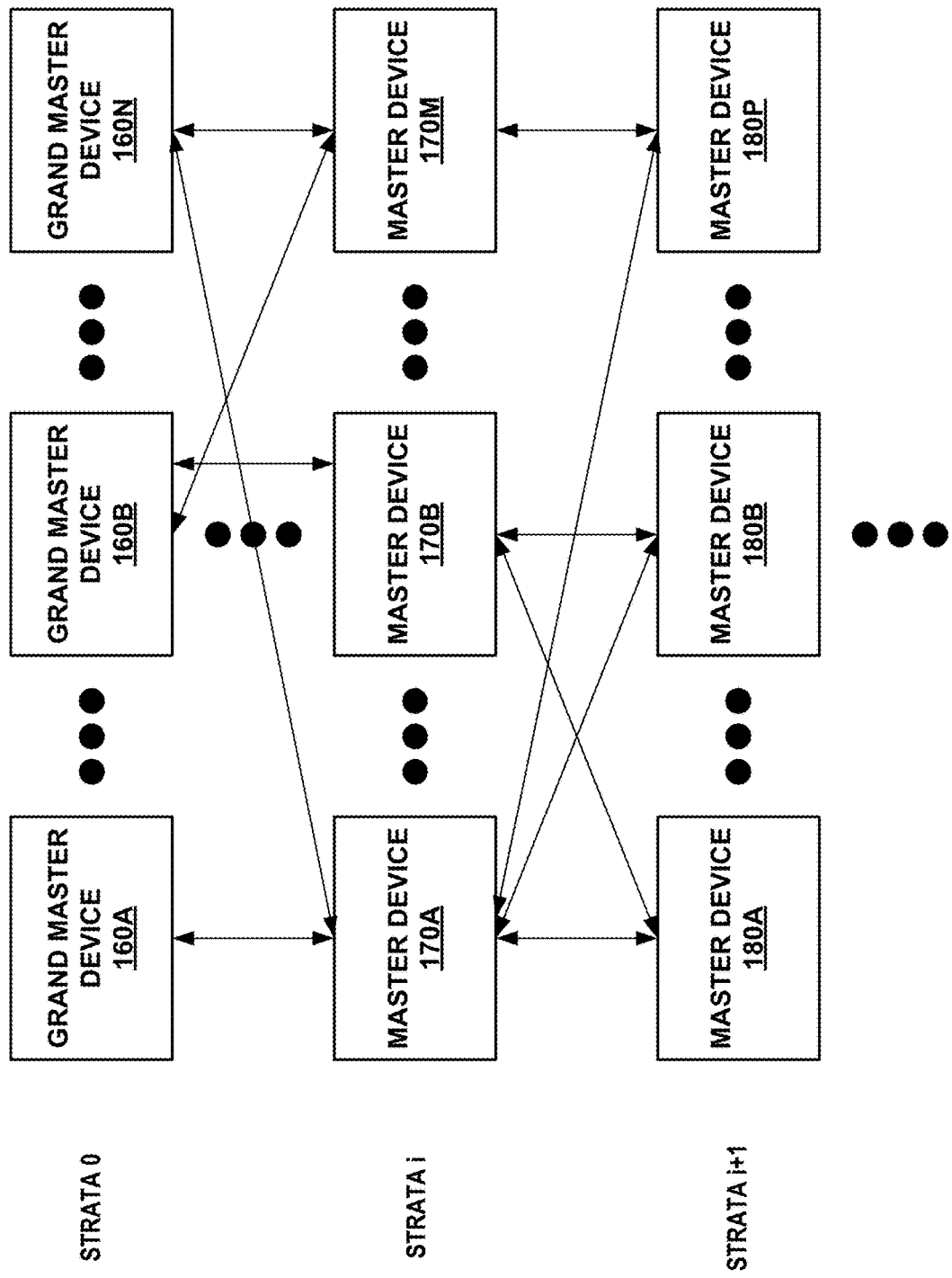
FIG. 7 is a conceptual diagram illustrating different strata of example grand master devices and other master devices within a network, in accordance with one or more techniques of the current disclosure.

FIG. 7 is a conceptual diagram illustrating different strata of example grand master devices and other master devices within a network, in accordance with one or more techniques of the current disclosure. In the example of FIG. 7, grand master devices 160A-160N may be master devices connected directly to GPS modules, or GPS master devices. Two devices in the system can be connected or disconnected. In some examples, each end device is connected to a single master device (e.g., any of grand master devices 160A-160N, master devices 170A-170M, or master devices 180A-180P).

Master devices may be separated into several strata. Master devices assigned to the same strata (e.g., each of master devices 170A-170M) are considered to be similar and master devices assigned to different strata (e.g., grand master device 160A and master device 180A) are considered to be different. For instance, all grand master devices 160A-160N can be assigned to strata 0 and non-grand master devices may be assigned to the strata 1. Grand master device 160A (a strata 0 device) has access to more precise timing data than non-grand master devices (e.g., strata i master devices 170A-170M). In such cases where grand master device 160A is connected to master device 170A, grand master device 160A is a source of precise time and strata 0 is more "senior" than strata i. Strata levels may be assigned such that strata level "i" has more precise timestamps than strata level "i+1" due to the amount of connections between the respective master device and grand master devices 160A-160N.

Synchronization systems may have several GPS-enabled cluster nodes and multiple non-GPS cluster nodes. GPS-enabled cluster nodes may include strata 0 grand master devices (e.g., grand master devices 160A-160N), strata 1 master devices (e.g., master devices 170A-170M), and end devices. Non-GPS cluster nodes may include strata 1 master devices (e.g., master devices 170A-170M), strata 2 master devices (e.g., master devices 180A-180M), and end devices. In heterogeneous systems, the systems may include several GPS-enabled cluster nodes and numerous non-GPS (generic) cluster nodes.

Some differences between Master and Leaf Devices include the following: Master Devices are always connected to more precise source of timestamps than Leaf Devices. In practical implementation, Master Devices belong to the service provider solution and Leaf Devices belong to the service client. Leaf Devices always receive Timestamp Offsets from Master Devices. In different heterogeneous networks Master and Leaf Devices connections can vary.

Devices from the same Cluster Node are typically connected through LAN. Such network connection is very fast and LAN network load is usually low. Different Cluster Nodes in many cases are connected over the Internet. Network connection over the Internet is comparatively slow and network load cannot be controlled by the Synchronization Service provider and usually vary significantly.

Network load, distance between devices, device physical parameters, device operation system and usage practice affect the synchronization process and timestamp offset computation.

Figure 8:
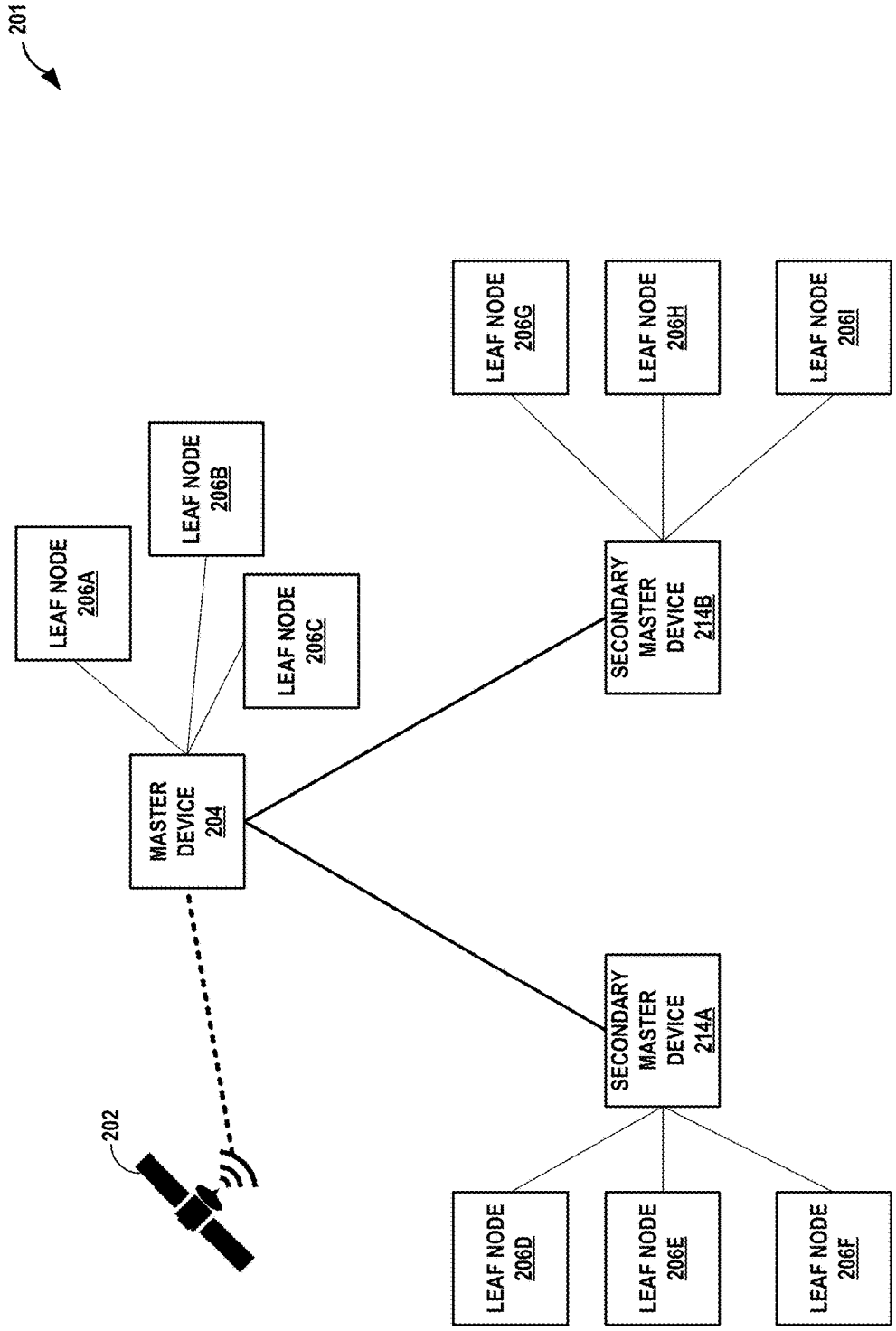
FIG. 8 is a conceptual diagram of an example time synchronization system with a global positioning system (GPS) device, a master device, multiple secondary master devices, and multiple leaf nodes connected to each of the master devices, in accordance with one or more techniques of the current disclosure.

FIG. 8 is a conceptual diagram of an example time synchronization system 201 with a GPS device 202, a master device 204, multiple secondary master devices 214A-214B, and multiple leaf nodes 206A-206G connected to each of the master devices, in accordance one or more techniques of the current disclosure. Time synchronization system 201 may include a simulation device or system such as computing device 40 (not shown) configured to operate in accordance with the techniques of this disclosure. In some examples, the simulation device may be part of master device 204.

Each of GPS 202, master device 204, secondary master devices 214A-214B, and leaf nodes 206A-206G may be examples of the devices defined and described above having like names. In the example of FIG. 8, synchronization system 201 may be contained within a single cluster, with each of master device 204, secondary master devices 214A-214B, and leaf nodes 206A-206G being located in the same geographical area, such as the same metropolitan area.

In the example of FIG. 8, master device 204 would be considered to be a "strata 0" master device, as master device 204 is in direct contact with GPS 202 in order to get the most accurate time settings. Secondary master devices 214A and 214B are each in contact with master device 204, meaning secondary master devices 214A and 214B would be considered "strata 1" master devices.

In some examples, master device 204 may be connected to secondary master devices 214A, 214B via a cloud exchange fabric (not shown). Leaf-to-leaf connections may likewise be made via the cloud exchange fabric. In other examples, rather than being connected to one another via cloud exchange fabric, any of leaf nodes 206 and master devices 204, 214 may be interconnected by direct link connections, metro-connection, and connected via the Internet. These different types of connections may be configurable by a simulator system for simulating time synchronization in a network such as system 201.

In some instances, prior to master device 204 performing a time synchronization process, GPS 202 may be configured to send a timestamp in a data packet to master device 204. Master device 204 may receive the timestamp and synchronize an internal clock on master device 204 to the timestamp received from GPS 202.

Master device 204 may be configured to perform a time synchronization process with any of leaf nodes 206, either individually or in combination, via secondary master devices 214. In some examples, master device 204 may only perform the time synchronization techniques when network conditions indicate that an acceptable environment for master device 204 to perform the time synchronization techniques. In the example of FIG. 8, this means that master device 204 may perform the time synchronization techniques described herein when network conditions of a direct link with the leaf node or the secondary master device indicate that the network environment is acceptable, or when network conditions of the cluster in general indicate that the network environment is acceptable. For instance, master device 204 may check a network load for time synchronization system 201 to determine if the current bandwidth usage is above a point where it would be cumbersome on the network to perform the time synchronization techniques described herein, as sending additional time synchronization-related packets between network devices may exacerbate network congestion issues. The network conditions may be checked individually with each leaf node (e.g., bandwidth usage over a connection directly between master device 204 and the respective leaf node) or at the cluster level (e.g., a total bandwidth usage for a LAN that includes all of the end devices and/or secondary master devices in the cluster that will undergo the time synchronization process). If the network conditions are checked at the individual level or the cluster level, master device 204 may perform the time synchronization process with the leaf node or with each leaf node in the respective cluster once the network conditions for the individual leaf node or the network conditions for the cluster indicate that the environment is suitable for master device 204 to send the time synchronization packets.

The network conditions may also include device health for the leaf node. As with the bandwidth usage, master device 204 may check the device health for the individual leaf node to receive the time synchronization packet or an aggregate device health for the cluster that includes the individual leaf node to receive the time synchronization packet. When the leaf node includes an end device or an aggregate of multiple devices in the same cluster, device health may include an estimated cluster node network load, a number of inactive master and end devices, and/or a ratio of inactive to total master and end devices.

In some instances, in addition to the network condition check or without the network condition check, master device 204 may aggregate offsets across multiple leaf nodes of leaf nodes 206 in order to calculate a universal time synchronization offset value that is sent to each leaf node, either in a particular cluster or across multiple clusters. For instance, master device 204 may determine what the timestamp offset would be for each leaf node that will receive the time synchronization packet. To aggregate the timestamp offsets, master device 204 may take a strict average of the determined offsets, or the aggregate may weight the various timestamp offsets, as examples. The weights may be selected based on an amount of time the device has been a part of the network, or based on a deviation from a distribution of the various offsets. In this manner, the weight may correlate to the likely accuracy of the timestamp offsets provided by the device. For example, master device 204 may be configured (e.g., with policies) to assign a lower weight to a device that has been part of the network longer, and to assign a higher weight to a device that has been part of the network for a shorter time, because internal components of a newer network device may provide more accurate timestamping. For instance, after finding a best fit for the distribution of timestamp offsets, master device 204 may completely disregard a timestamp offset that is an outlier from the distribution, or may weight a timestamp offset very highly if the timestamp offset is close to a mean or median of the distribution.

Figure 9:
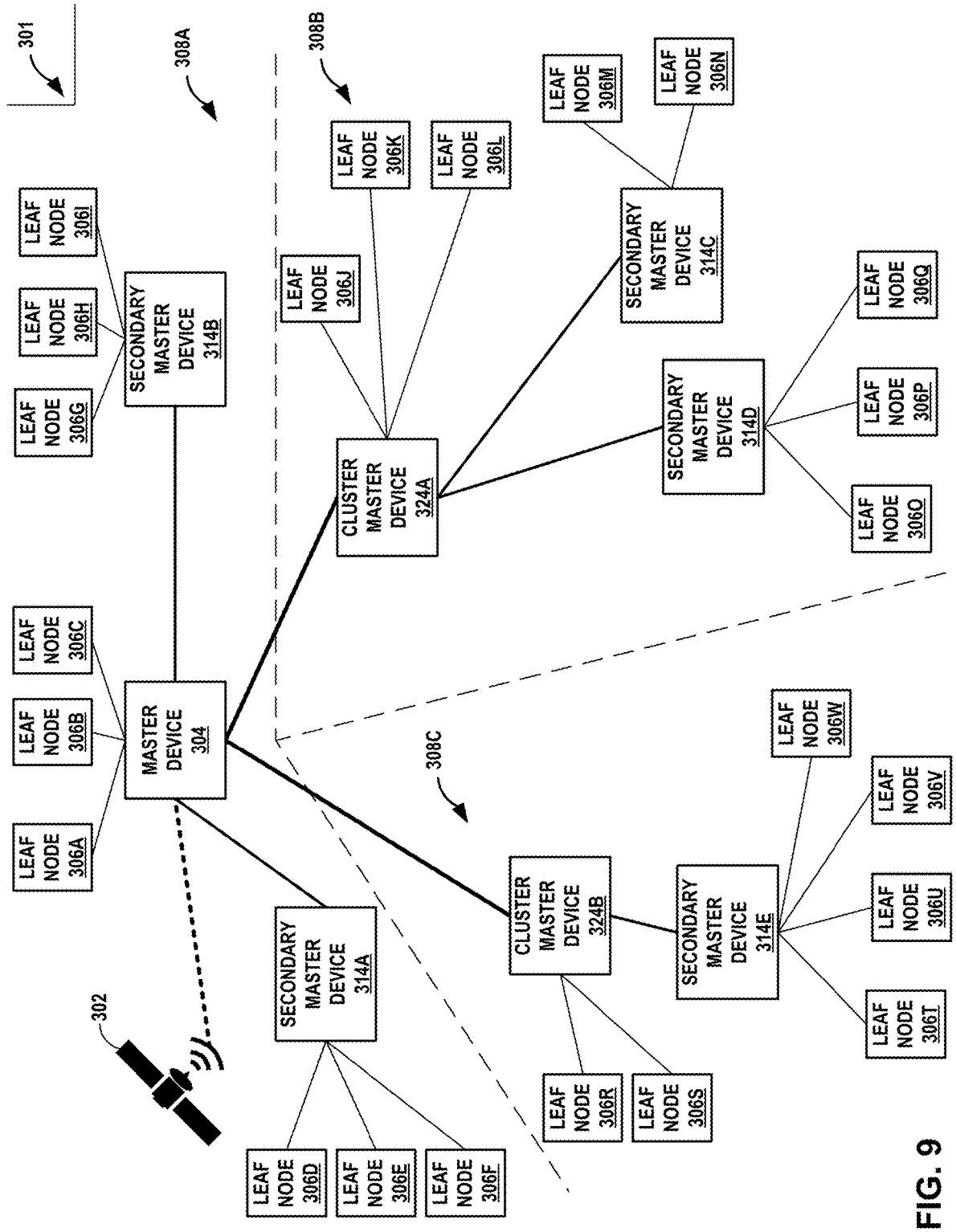
FIG. 9 is a conceptual diagram of an example cross-cluster time synchronization system with a global positioning system (GPS) device, a grand master device, multiple secondary master devices, multiple cluster master devices, and multiple leaf nodes connected to each master device, in accordance with one or more techniques of the current disclosure.

FIG. 9 is a conceptual diagram of an example cross-cluster time synchronization system 301 with a GPS device 302, a master device 304, multiple secondary master devices 314A-314E, multiple cluster master devices 324A-324B, and multiple leaf nodes 306A-306W connected to each master device, in accordance one or more techniques of the current disclosure. Time synchronization system 301 may include a simulation device or system such as computing device 40 (not shown) configured to operate in accordance with the techniques of this disclosure. In some examples, the simulation device may be part of master device 304.

Each of GPS 302, master device 304, secondary master devices 314A-314E, cluster master devices 324A-324B, and leaf nodes 306A-306W may be examples of the devices defined and described above having like names. In the example of FIG. 9, these devices may be spread throughout multiple clusters 308A-308C, which indicate that the devices in each cluster are located in different geographical areas.

In some examples, master device 304 may be connected to secondary master devices 314A, 314B and/or cluster master devices 324A-324B via a cloud exchange fabric (not shown), as described with respect to FIG. 1. Leaf-to-leaf connections (including between secondary master devices within a cluster, for example) may likewise be made via a cloud exchange fabric. In other examples, rather than being connected to one another via cloud exchange fabric, any of leaf nodes and master devices may be interconnected by direct link connections, metro-connection, and connected via the Internet. These different types of connections may be configurable by a simulator system for simulating time synchronization in a network such as system 301.

In the example of FIG. 9, master device 304 would be considered to be a "strata 0" master device, as master device 304 is in direct contact with GPS 302 in order to get the most accurate time settings. Secondary master devices 314A and 314B are each in direct contact with master device 304, meaning secondary master devices 314A and 314B would be considered "strata 1" master devices. Cluster master devices 324A and 324B, while located in different clusters, are also each in direct contact with master device 304, meaning cluster master devices 324A and 324B are also considered "strata 1" ("stratum 1") master devices. Secondary master devices 314C, 314D, and 314E receive timestamp offsets from master device 304 via an intermediary device (i.e., cluster master devices 324A and 324B), meaning secondary master devices 314C, 314D, and 314E would be considered "strata 2" ("stratum 2") master devices.

In some instances, prior to master device 304 performing a time synchronization process in accordance with the techniques described herein, GPS 302 may be configured to send a timestamp in a data packet to master device 304. Master device 304 may receive the timestamp and synchronize an internal clock on master device 304 to the timestamp received from GPS 302.

Master device 304 may be configured to perform a time synchronization process with any of leaf nodes 306, either individually or in combination, via secondary master devices 314 and/or cluster master devices 324. As such, master device 304 may be configured to perform the time synchronization process described herein directly with end devices (e.g., leaf nodes 306A-306C), with secondary master devices within a same cluster as master device 304 (e.g., secondary master devices 314A-314B), or with cluster master devices in other clusters separate from the cluster that contains master device 304 (e.g., cluster master devices 324A-324B).

In some examples, master device 304 may only perform the time synchronization techniques when network conditions indicate that an acceptable environment for master device 304 to perform the time synchronization techniques. For instance, master device 304 may check a network load for time synchronization system 301 to determine if the current bandwidth usage is above a point where it would be cumbersome on the network to perform the time synchronization techniques described herein. The network conditions may be checked individually with each leaf node (e.g., bandwidth usage over a connection directly between master device 304 and the respective leaf node), at the cluster level (e.g., a total bandwidth usage for a LAN that includes all of the end devices and/or secondary master devices in the cluster that will undergo the time synchronization process), or at the system level (e.g., a total bandwidth usage for multiple clusters in the overall system). If the network conditions are checked at the individual level or the cluster level, master device 304 may perform the time synchronization process with the leaf node or with each leaf node in the respective cluster once the network conditions for the individual leaf node or the network conditions for the cluster indicate that the environment is suitable for master device 304 to send the time synchronization packets.

In some examples, time synchronization system 301 may be configured such that each of clusters 308A-308C for the techniques described herein correspond to data centers in different geographical or metropolitan areas. Data centers may house multiple different types of devices (e.g., master device 304, secondary master devices 314A-314E, cluster master devices 324A-324B, and leaf nodes 306A-306W) that are communicatively coupled inside this overall data center structure, with master device 304 and cluster master devices 324 being configured to perform communication across different clusters 308. As such, service providers (e.g., data center operators) may implement the techniques described herein as a service to customers to synchronize the clocks on customer devices within the same cluster (e.g., within cluster 308A), as well as with devices in remote clusters 308B and 308C in different geographical areas. In some examples, some aspects of the techniques described herein may be implemented as a downloadable software plugin which executes on customer equipment, e.g., in a data center, and enables master device 304 in cluster 308A to perform the time synchronization processes as described herein. In some examples, leaf nodes 306 may correspond to customer equipment having a software plugin and/or network card installed that enable the receipt and ability to perform the client-side time synchronization actions based on the received timestamp offsets.

When each of clusters 308 are in different regions (e.g., within different data centers, and possibly different metros), they may be separated by long distances as compared to devices within the same cluster/data center. Over long distances, time synchronization may be difficult given that the connections between clusters 308 may cover many hops (intermediate devices) and communications may experience delay or attenuation due to the additional distance. Arranging system 301 in a hierarchical manner that includes a master device per cluster may allow for more efficient time synchronization. In addition, by utilizing the techniques described herein, master device 304 may only perform the time synchronization process when the network conditions indicate the congestion over the network and/or the health of the clusters are conducive to the time synchronization process occurring without hindering any of the devices participating in the process. For instance, if a connection between clusters 308A and 308B is highly congested, performing a time synchronization process while the connection is congested may lead to increased packet loss and round-trip time for the data already traversing the connection between clusters 308A. Further, if packet loss or increased round trip time occurs for the packets in the time synchronization process, the time synchronization may be incorrect and inefficient. By utilizing the techniques described herein, master device 304 may selectively perform the time synchronization process only at times in which the synchronization process will not hinder other processes or be hindered by other processes.

In this context, across clusters 308 in different data centers and/or regions, there may be a high level of heterogeneity in devices, that is, the devices may have varying characteristics that affect time synchronization precision. For instance, cluster 308A may have a very different set of devices than cluster 308B, as the various clusters may have been acquired by the operator and have legacy equipment different than that found in other clusters. Different clusters may mainly use different vendors, or the equipment in some clusters may be older than the equipment in other clusters. The techniques of this disclosure can easily accommodate this situation and enable seamless time synchronization across the variety of devices, e.g., due to the health checks that are performed on the devices themselves prior to including the device in the time synchronization process. These benefits may be increased when master device 304 must perform the time synchronization process with devices where multiple hops (i.e., connections between different devices that the data packets will traverse) are needed between master device 304 and the end device receiving the timestamp offset.

The network conditions may also include device health for the leaf node. As with, the bandwidth usage, master device 4 may check the device health for the individual leaf node to receive the time synchronization packet, an aggregate device health for the cluster that includes the individual leaf node to receive the time synchronization packet, or an aggregate device health for multiple clusters that are each to receive the time synchronization packet. When the leaf node includes an end device or an aggregate of multiple devices in the same cluster, device health may include an estimated cluster node network load, a number of inactive master and end devices, and/or a ratio of inactive to total master and end devices. When the device health includes an aggregate across multiple clusters, the cross-cluster health metric may include an estimated cross-cluster network load, a number of inactive master devices, a ratio of inactive to total devices, and a number of routing nodes (switches) between each air of master devices.

Figure 10:
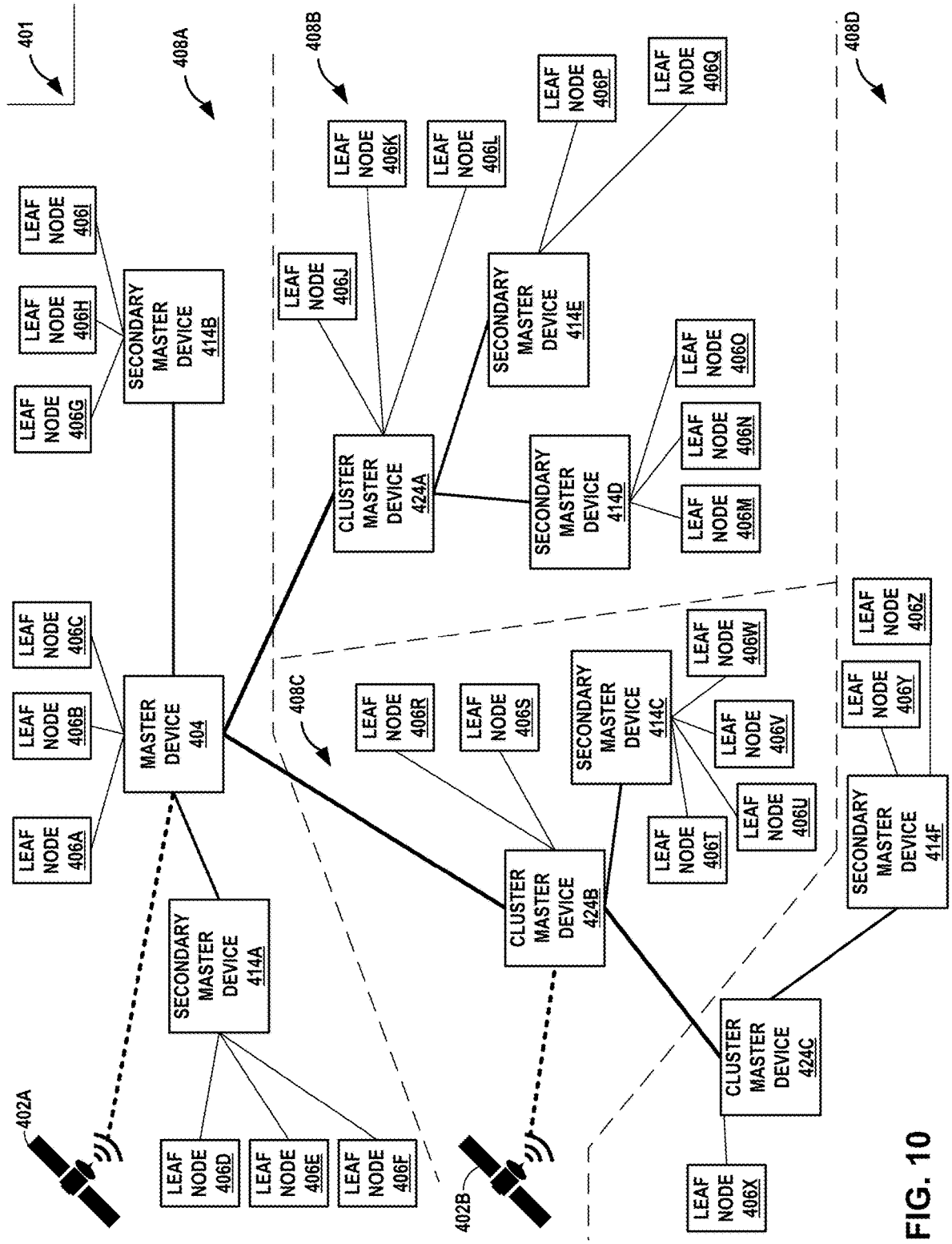
FIG. 10 is a conceptual diagram of an example cross-cluster time synchronization system with a global positioning system (GPS) device, a master device, multiple secondary master devices, multiple cluster master devices, and multiple leaf nodes connected to each master device, in accordance with one or more techniques of the current disclosure.

FIG. 10 is a conceptual diagram of an example cross-cluster time synchronization system 401 with a GPS device 402A-402B, a computing device 404, multiple secondary master devices 414A-414F, multiple cluster master devices 424A-424C, and multiple leaf nodes 406A-406Z connected to each master device, in accordance one or more techniques of the current disclosure. Time synchronization system 401 may include a simulation device or system such as computing device 40 (not shown) configured to operate in accordance with the techniques of this disclosure. In some examples, the simulation device may be part of master device 404.

Each of GPSs 402A-402B, computing device 404, secondary master devices 414A-414F, cluster master devices 424A-424C, and leaf nodes 406A-406G may be examples of the devices defined and described above having like names. In the example of FIG. 10, these devices may be spread throughout multiple clusters 408A-408D, which indicate that the devices in each cluster are located in different geographical areas.

In the example of FIG. 10, computing device 404 would be considered to be a "strata 0" master device, as computing device 404 is in direct contact with GPS 402A in order to get the most accurate time settings. The example of FIG. 10 includes a second GPS in GPS 402B, which is directly connected to cluster master device 424B. This means that cluster master device 424B is also a "strata 0" master device. Secondary master devices 414A, 414B, and 414C are each in direct contact with one of computing device 404 or cluster master device 424B, meaning secondary master devices 414A, 414B, and 414C would be considered "strata 1" master devices. Cluster master devices 424A and 424C, while located in different clusters, are also each in direct contact with one of computing device 404 or cluster master device 424B, meaning cluster master devices 424A and 424C are also considered "strata 1" master devices. Secondary master devices 414D, 414E, and 414F receive timestamp offsets from one of computing device 404 or cluster master device 424B via an intermediary device (i.e., cluster master devices 424A and 424C), meaning secondary master devices 414D, 414E, and 414F would be considered "strata 2" master devices.

Time synchronization system 401 of FIG. 10 is similar to time synchronization system, but further includes an additional GPS 402B in communication with cluster master device 424B. For instance, while some clusters may be located within the same country or the same geographic region, clusters may also be located across different continents, for example. This distance may hinder the efficiency and/or practicality of utilizing a single GPS to synchronize the clocks of devices in these different continents. By adding GPS 402B to the system, multiple master devices may perform the time synchronization processes described herein, or the respective master devices 404 and 424B may be in communication with one another to create a universal timestamp offset that accounts for the differences across continents. As such, while computing device 404 may perform the time synchronization techniques described herein, cluster master device 424B may also be configured to perform similar time synchronization techniques for leaf nodes and secondary/cluster master devices that are closer to cluster master device 424B than they are to computing device 404. This is due to cluster master device 424B having direct communication with a source of accurate, precise time.

FIGS. 11-12 are conceptual diagrams illustrating an example user interface that include reports generated according to one or more techniques of this disclosure.

Depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 13:
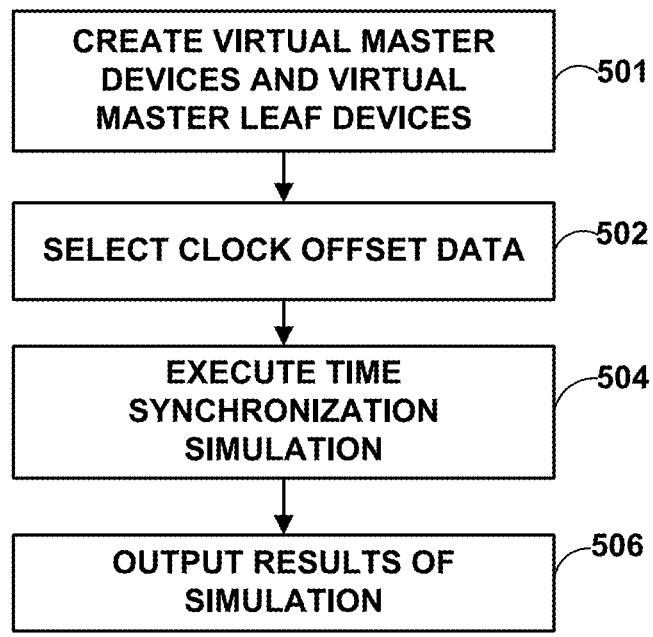
FIG. 13 is a flowchart illustrating an example process performed by one or more devices of the computing system described herein.

FIG. 13 is a flowchart illustrating an example process performed by one or more devices of the computing system described herein. A computing system creates, in response to user input, one or more virtual master devices and a plurality of virtual leaf devices in a virtual network system (501). The computing system selects data from one or more of real-time clock offset data, prerecorded clock offset data, or synthetically generated clock offset data (502). The computing system executes a time synchronization simulation by applying a predefined clock offset generation algorithm to the selected data (504), and outputs data indicative of results of the time synchronization simulation (506).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), graphics processing units (GPUs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method comprising:
    creating, by a computing system and in response to user input, one or more virtual master devices and a plurality of virtual leaf devices in a simulated network system, wherein the virtual master and virtual leaf devices are modeled representations of simulated network devices that do not process actual network traffic;
    selecting, by the computing system, data from one or more of real-time clock offset data, prerecorded clock offset data, or synthetically generated clock offset data;
    executing, by the computing system, a time synchronization simulation by applying a predefined clock offset generation algorithm to the selected data in the simulated network system; and
    outputting, by the computing system, data indicative of results of the time synchronization simulation.

2. The method of claim 1, further comprising modifying a synchronization system in a network based on the data indicative of the results of the simulation, wherein the synchronization system comprises one or more real master devices and a plurality of real leaf devices, wherein the real master devices and the real leaf devices are physical or virtualized devices deployed in the network to process actual network traffic.

3. The method of claim 2, wherein modifying the synchronization system comprises configuring one or more real master devices and a plurality of real leaf devices to apply the predefined clock offset generation algorithm to determine clock offsets during operation of the real master devices and real leaf devices.

4. The method of claim 1, wherein the time synchronization simulation comprises a first time synchronization simulation, and the predefined clock offset generation algorithm comprises a first clock offset generation algorithm, and the data indicative of results of the time synchronization simulation comprises first data, the method further comprising:
    executing a second time synchronization simulation by separately applying a second clock offset generation algorithm to the selected data in the simulated network system;
    outputting, by the computing system, second data indicative of results of the second time synchronization simulation; and
    selecting one of the first clock offset generation algorithm and the second clock offset generation algorithm for application to a synchronization system in a network based on analysis of the first data relative to the second data, wherein the synchronization system comprises one or more real master devices and a plurality of real leaf devices, wherein the real master devices and the real leaf devices are physical or virtualized devices deployed in the network to process actual network traffic.

5. The method of claim 1, further comprising:
    receiving, by the computing system, input defining a clock time desynchronization schedule; and
    applying, by the computing system, the clock time desynchronization schedule to the simulated network system.

6. The method of claim 1, further comprising creating, by a computing system and in response to user input, connections between the one or more virtual master devices and the plurality of virtual leaf devices, wherein the user input specifies connection types comprising one or more of virtual circuit connections via a cloud exchange, direct cross-connects, metro-connection, or connection.

7. The method of claim 1, further comprising receiving, via a user interface, data defining the predefined clock offset generation algorithm.

8. A computing system comprising:
    a memory; and
    processing circuitry configured to:
        create, in response to user input, one or more virtual master devices and a plurality of virtual leaf devices in a simulated network system, wherein the virtual master and virtual leaf devices are modeled representations of simulated network devices that do not process actual network traffic;
        select data from one or more of real-time clock offset data, prerecorded clock offset data, or synthetically generated clock offset data;
        execute a time synchronization simulation by applying a predefined clock offset generation algorithm to the selected data in the simulated network system; and
        output data indicative of results of the time synchronization simulation.

9. The computing system of claim 8, wherein the processing circuitry is further configured to modify a synchronization system in a network based on the data indicative of the results of the simulation, wherein the synchronization system comprises one or more real master devices and a plurality of real leaf devices, wherein the real master devices and the real leaf devices are physical or virtualized devices deployed in the network to process actual network traffic.

10. The computing system of claim 9, wherein to modify the synchronization system comprises to configure one or more real master devices and a plurality of real leaf devices to apply the predefined clock offset generation algorithm to determine clock offsets during operation of the real master devices and real leaf devices.

11. The computing system of claim 8, wherein the time synchronization simulation comprises a first time synchronization simulation, and the predefined clock offset generation algorithm comprises a first clock offset generation algorithm, and the data indicative of results of the time synchronization simulation comprises first data, wherein the processing circuitry is further configured to:
- execute a second time synchronization simulation by separately applying a second clock offset generation algorithm to the selected data in the simulated network system;
- output, by the computing system, second data indicative of results of the second time synchronization simulation; and
- select one of the first clock offset generation algorithm and the second clock offset generation algorithm for application to a synchronization system in a network based on analysis of the first data relative to the second data, wherein the synchronization system comprises one or more real master devices and a plurality of real leaf devices, wherein the real master devices and the real leaf devices are physical or virtualized devices deployed in the network to process actual network traffic.

12. The computing system of claim 8, wherein the processing circuitry is further configured to:
- receive input defining a clock time desynchronization schedule; and
- apply the clock time desynchronization schedule to the simulated network system.

13. The computing system of claim 8, wherein the processing circuitry is further configured to create, in response to user input, connections between the one or more virtual master devices and the plurality of virtual leaf devices, wherein the user input specifies connection types comprising one or more of virtual circuit connections via a cloud exchange, direct cross-connects, metro-connection, or connection.

14. The computing system of claim 8, wherein the processing circuitry is further configured to receive, via a user interface, data defining the predefined clock offset generation algorithm.

15. A non-transitory computer-readable storage medium comprising instructions that, when executed by one or more processors, cause the one or more processors to:
- create, in response to user input, one or more virtual master devices and a plurality of virtual leaf devices in a simulated network system, wherein the virtual master and virtual leaf devices are modeled representations of simulated network devices that do not process actual network traffic;
- select data from one or more of real-time clock offset data, prerecorded clock offset data, or synthetically generated clock offset data;
- execute a time synchronization simulation by applying a predefined clock offset generation algorithm to the selected data in the simulated network system; and
- output data indicative of results of the time synchronization simulation.

16. The non-transitory computer-readable storage medium of claim 15, wherein the instructions cause the one or more processors to modify a synchronization system in a network based on the data indicative of the results of the simulation, wherein the synchronization system comprises one or more real master devices and a plurality of real leaf devices, wherein the real master devices and the real leaf devices are physical or virtualized devices deployed in the network to process actual network traffic.

17. The non-transitory computer-readable storage medium of claim 16, wherein the instructions cause the one or more processors to: to configure one or more real master devices and a plurality of real leaf devices to apply the predefined clock offset generation algorithm to determine clock offsets during operation of the real master devices and real leaf devices.

18. The non-transitory computer-readable storage medium of claim 15, wherein the time synchronization simulation comprises a first time synchronization simulation, and the predefined clock offset generation algorithm comprises a first clock offset generation algorithm, and the data indicative of results of the time synchronization simulation comprises first data, wherein the instructions cause the one or more processors to:
- execute a second time synchronization simulation by separately applying a second clock offset generation algorithm to the selected data in the simulated network system;
- output, by the computing system, second data indicative of results of the second time synchronization simulation; and
- select one of the first clock offset generation algorithm and the second clock offset generation algorithm for application to a synchronization system in a network based on analysis of the first data relative to the second data, wherein the synchronization system comprises one or more real master devices and a plurality of real leaf devices, wherein the real master devices and the real leaf devices are physical or virtualized devices deployed in the network to process actual network traffic.

19. The non-transitory computer-readable storage medium of claim 15, wherein the instructions cause the one or more processors to:
- receive input defining a clock time desynchronization schedule; and
- apply the clock time desynchronization schedule to the simulated network system.

20. The non-transitory computer-readable storage medium of claim 15, wherein the instructions cause the one or more processors to create, by a computing system and in response to user input, connections between the one or more virtual master devices and the plurality of virtual leaf devices, wherein the user input specifies connection types comprising one or more of virtual circuit connections via a cloud exchange, direct cross-connects, metro-connection, or connection.

* * * * *

UNITED STATES PATENT AND TRADEMARK OFFICE
CERTIFICATE OF CORRECTION

| | | |
|---|---|---|
| PATENT NO. | : 11,502,913 B1 | |
| APPLICATION NO. | : 17/071420 | |
| DATED | : November 15, 2022 | |
| INVENTOR(S) | : Yakov Kamen, Yury Kamen and Alex Wilms | |

It is certified that error appears in the above-identified patent and that said Letters Patent is hereby corrected as shown below:

On the Title Page

First column, Item (56) References Cited, replace "3,416,812" with --8,416,812--.

Signed and Sealed this
Twenty-first Day of March, 2023

*Katherine Kelly Vidal*

Katherine Kelly Vidal
*Director of the United States Patent and Trademark Office*